(12) United States Patent
Inakoshi et al.

(10) Patent No.: US 10,191,928 B2
(45) Date of Patent: Jan. 29, 2019

(54) PLANAR GRAPH GENERATION DEVICE AND METHOD

(71) Applicant: FUJITSU LIMITED, Kawasaki-shi, Kanagawa (JP)

(72) Inventors: Hiroya Inakoshi, Tama (JP); Tatsuya Asai, Kawasaki (JP); Hiroaki Morikawa, Kawasaki (JP); Junichi Shigezumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1056 days.

(21) Appl. No.: 14/510,223

(22) Filed: Oct. 9, 2014

(65) Prior Publication Data
US 2015/0106392 A1 Apr. 16, 2015

(30) Foreign Application Priority Data

Oct. 11, 2013 (JP) ................................ 2013-214120

(51) Int. Cl.
*G06F 17/30* (2006.01)

(52) U.S. Cl.
CPC .............. *G06F 17/30324* (2013.01)

(58) Field of Classification Search
CPC .......... G06F 17/30324; G01C 21/3446; G06Q 10/047; G06Q 30/0283; H04L 45/12; H04L 45/34
See application file for complete search history.

(56) References Cited

U.S. PATENT DOCUMENTS

2010/0036606 A1 2/2010 Jones
2010/0305850 A1 12/2010 Krumm et al.

FOREIGN PATENT DOCUMENTS

| JP | 2001-125882 | 5/2001 |
| JP | 2006-267079 | 10/2006 |
| JP | 2010-508531 | 3/2010 |
| JP | 2013-54640 | 3/2013 |
| WO | WO 2005/111880 A1 | 11/2005 |

OTHER PUBLICATIONS

Barnette, David, On Generating Planar Graphs, University of California. Davis, Calif, 1974 (Year: 1974).*

(Continued)

*Primary Examiner* — Jerrah Edwards
(74) *Attorney, Agent, or Firm* — Staas & Halsey LLP

(57) ABSTRACT

A planar graph generation device that includes a processor that executes a process. The process includes: computing a specific value, including components of a value representing complexity of a track of the given track data, and a value representing a non-nearness between the given track data and each of all the other track data; selecting the track data with the smallest specific value among the collection; a first portion of the first track or a second portion of the second track positioned within the specific distance of each other, or a combination of the first portion and the second portion, is approximated to a specific portion such that a track of the addition target track data after addition passes through the specific portion in cases in which there are portions positioned within the specific distance of each other in a combination of the first track with the second track.

15 Claims, 21 Drawing Sheets

(56) References Cited

OTHER PUBLICATIONS

Japanese Office Action dated Apr. 4, 2017 in corresponding Japanese Patent Application No. 2013-214120.
Patent Abstracts of Japan, Publication No. 2001-125882, published May 11, 2001.
Patent Abstracts of Japan, Publication No. 2006-267079, published Oct. 5, 2006.
Espacenet, Publication No. JP2010508531 (A), published Feb. 28, 2007.
Patent Abstracts of Japan, Publication No. 2013-054640, published Mar. 21, 2013.

* cited by examiner

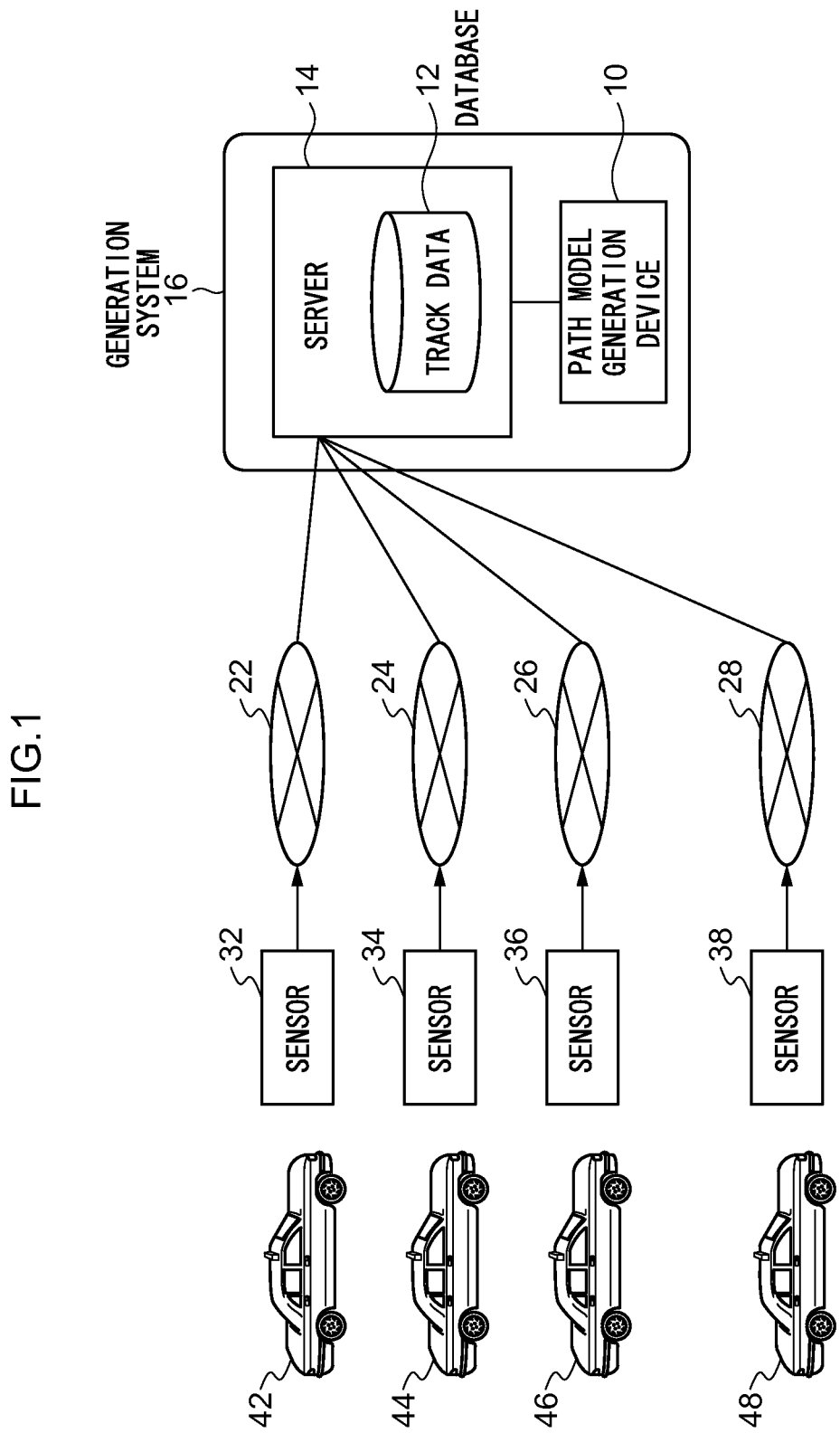

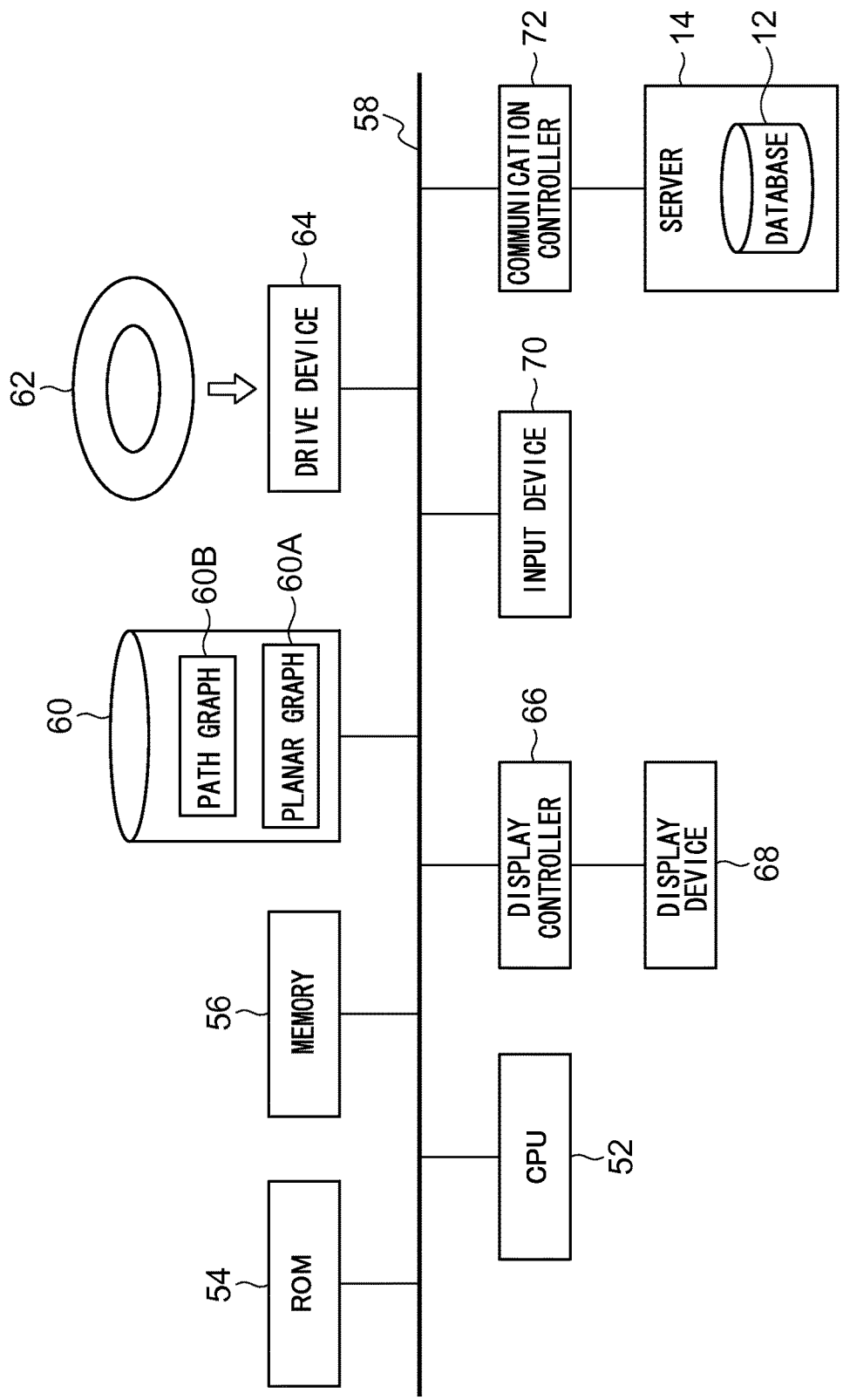

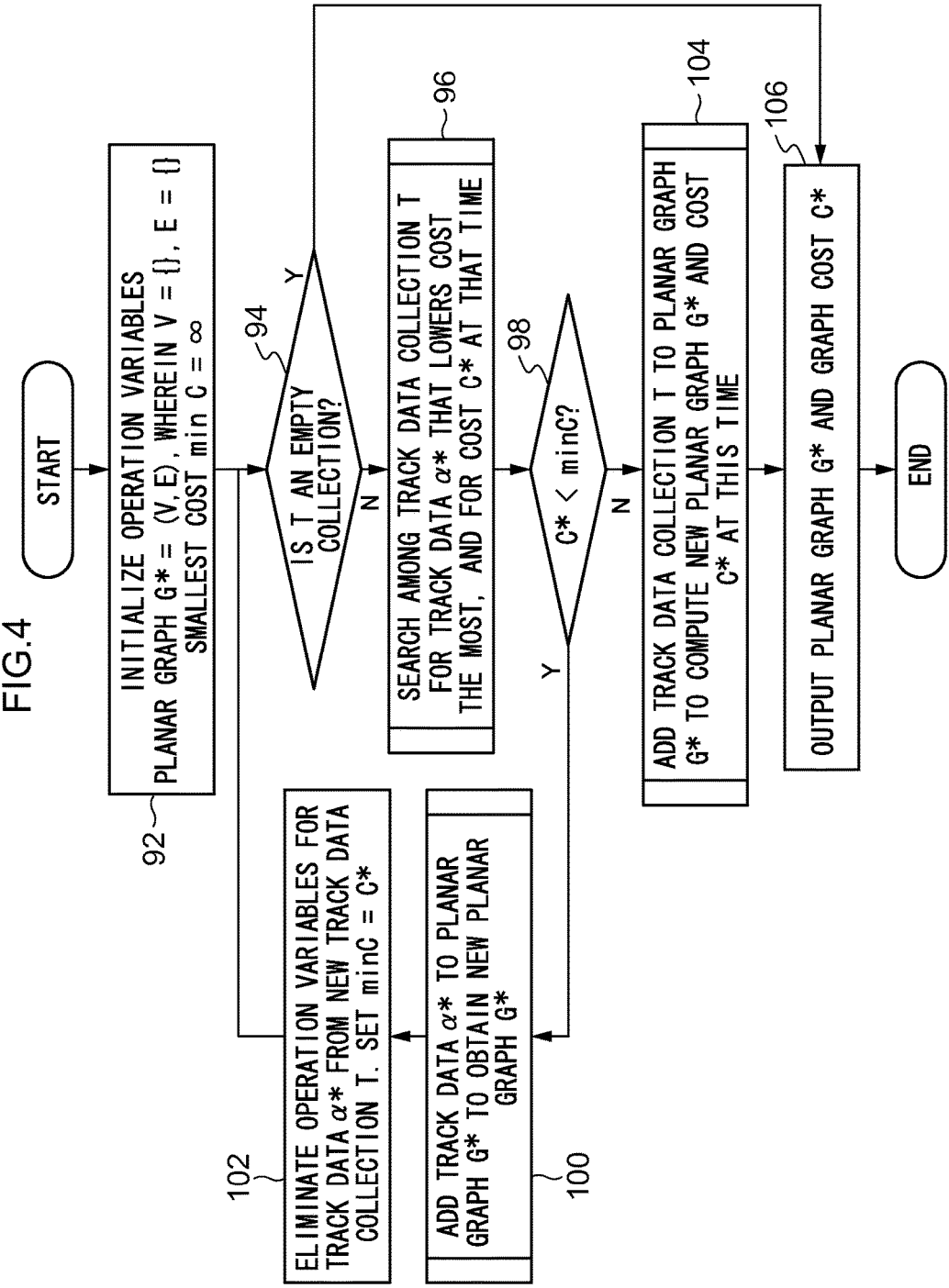

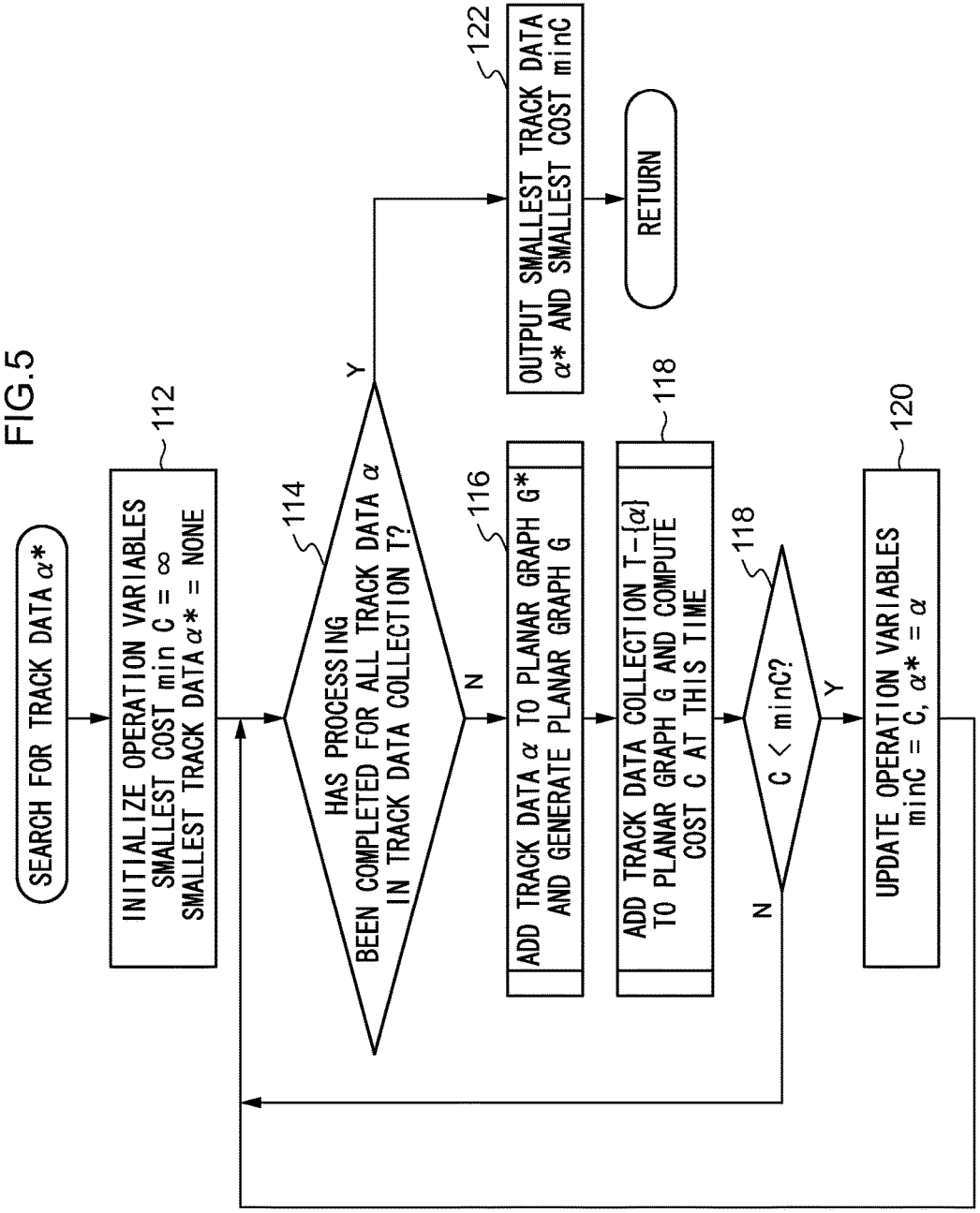

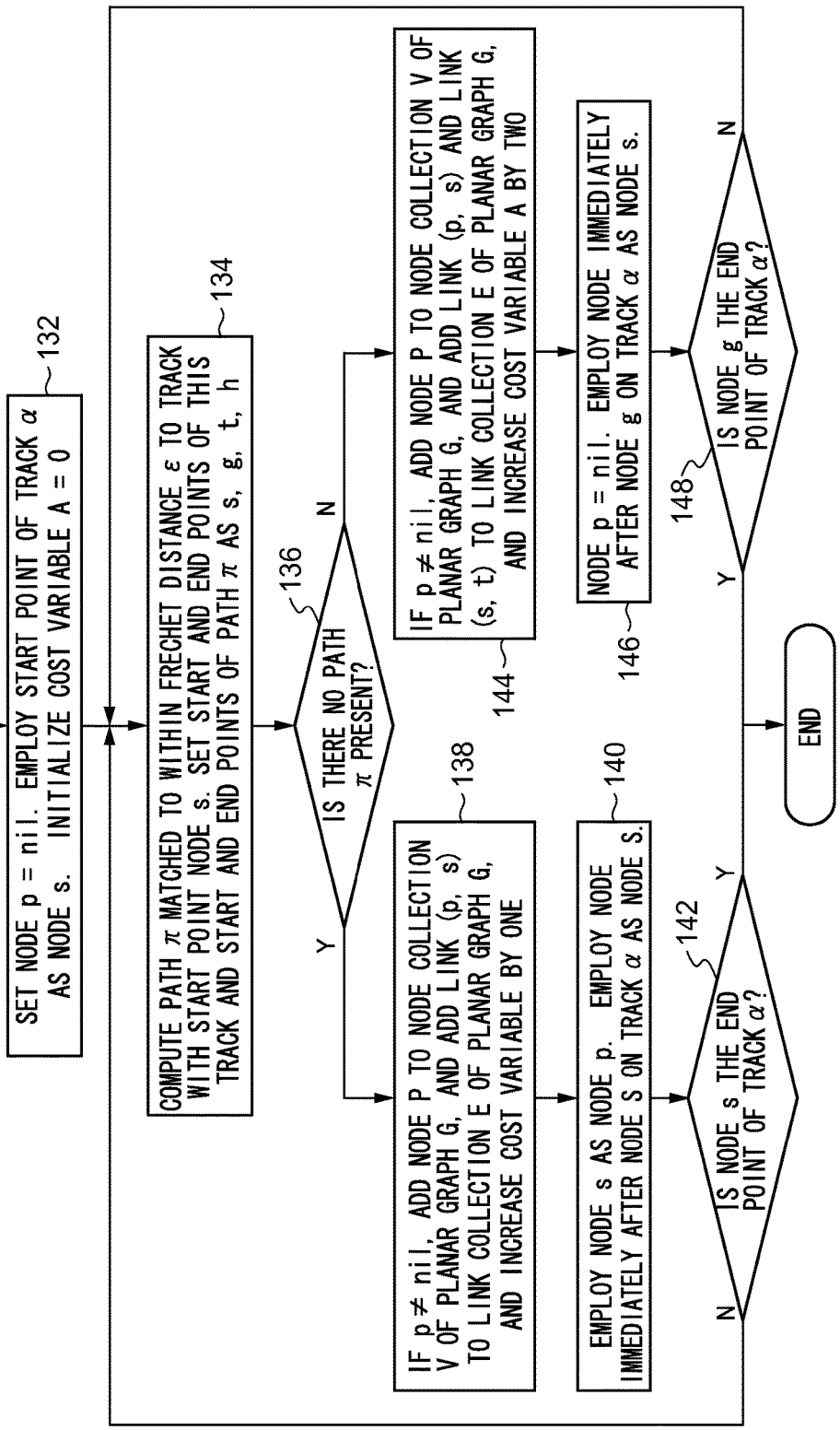

TRACK DATA COLLECTION $T = \{\alpha_1, \alpha_2, \alpha_3, \alpha_4\}$ $\alpha_1 = \langle p_1, p_2, p_3, p_4 \rangle$
$\alpha_2 = \langle p_5, p_6, p_7, p_8, p_9 \rangle$
$\alpha_3 = \langle p_{10}, p_{11}, p_{12} \rangle$
$\alpha_4 = \langle p_{13}, p_{14} \rangle$

| $\delta(\cdot,\cdot)$ | $\alpha_1$ | $\alpha_2$ | $\alpha_3$ | $\alpha_4$ |
|---|---|---|---|---|
| $G_1$ | — | 5 | 2 | 0 |
| $G_2$ | 4 | — | 1 | 2 |
| $G_3$ | 3 | 2 | — | 1 |
| $G_4$ | 1 | 5 | 2 | — |

FIG.15

| $\delta(\cdot,\cdot)$ | $\alpha_1$ | $\alpha_2$ | $\alpha_3$ | $\alpha_4$ |
|---|---|---|---|---|
| $G_{31}$ | — | 2 | — | 0 |
| $G_{32}$ | 3 | — | — | 1 |
| $G_{34}$ | 3 | 2 | — | — |

PLANAR GRAPH GENERATION DEVICE AND METHOD

CROSS-REFERENCE TO RELATED APPLICATION

This application is based upon and claims the benefit of priority of the prior Japanese Patent Application No. 2013-214120 filed on Oct. 11, 2013, the entire contents of which are incorporated herein by reference.

FIELD

The embodiments discussed herein are related to a planar graph generation device, a recording medium stored with a planar graph generation program, and a planar graph generation method.

BACKGROUND

Hitherto, path analysis was performed as follows in spatial data analysis. Namely, firstly origin-destination (OD) searches were performed to find a path from a specified origin to a destination out of plural path data. Secondly, frequent OD detection analyses were performed to derive, from plural track data, combinations of origin and destination ((Shinjuku Station, Shibuya Station), (Shinagawa Station, Ikebukuro Station), and so on) that appear a specific number of times (for example ten times) or more often. Thirdly, part-path searches were performed to find among path data any track data passing through a part-path (for example Shinagawa Station→(Yamanote-line clockwise)→Ikebukuro Station). Fourthly, frequent part-path detection analyses were performed to find part-paths appearing in the track data 10 times or more often. Such part-path analysis obtains appropriate search results in cases in which the paths to be subject to analysis in the track data are known in advance.

However, it is difficult to obtain appropriate search results in cases in which the paths to be subject to analysis in the track data are not known in advance. For example, consider a situation in which track data is obtained for people. Namely, sensors installed with a Global Positioning System (GPS) that periodically detects the latitude and the longitude are built in to mobile phones such as, for example, smartphones. This thereby enables coordinate data to be obtained of the positions (latitude and longitude) that people have moved through. In addition coordinate data used by GSM (registered trademark), WiFi, or the like can be obtained. However, people are able to move freely in an open space (such as an exhibition hall). In such cases, data such as the above XX Station is not obtainable for the data of each position moved through.

The people movement range is therefore divided into plural regions of a specific surface area (a mesh) in such cases, and each of the coordinates is translated onto the mesh. In such path analysis, the origin and destination (OD) are combined as a mesh pair, and paths are expressed on the mesh series.

Related Patent Documents

Japanese Laid-Open Patent Publication No. 2001-125882
Japanese Laid-Open Patent Publication No. 2013-54640

SUMMARY

According to an aspect of the embodiments, a planar graph generation device includes a memory, and a processor configured to execute a process. The process includes: in a collection of track data, each representing a track along which a moving body has moved, transitioning processing to another track data at each processing time, and for each given track data in the collection, computing a specific value, including components of a value representing complexity of a track of the given track data, and a value representing a non-nearness between the given track data and each of all the other track data in the collection other than the given track data; selecting the track data with the smallest specific value among the collection; based on the selected track data and on track data that is a target for addition of further track data (addition target track data), generating addition target track data after addition such that the selected track data is added to the addition target track data in cases in which there are no portions positioned within a specific distance of each other in any combination of the selected track data as a first track and each respective track of the addition target track data as a second track, and such that a first portion of the first track or a second portion of the second track positioned within the specific distance of each other, or a combination of the first portion and the second portion, is approximated to a specific portion such that a track of the addition target track data after addition passes through the specific portion in cases in which there are portions positioned within the specific distance of each other in a combination of the first track with the second track; and executing, for all track data in the collection, computation of the specific value, selection of track data having the smallest specific value, and generation of the addition target track data after addition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a path model generation system of an exemplary embodiment;

FIG. 2 is a block diagram illustrating a path model generation device;

FIG. 4 is a flowchart illustrating an example of path model generation processing executed by a path model generation device;

FIG. 5 is a flowchart illustrating an example of track data $\alpha^*$ search processing that searches for track data $\alpha^*$ of step 96 in FIG. 4;

FIG. 6 is a flowchart illustrating an example of track adding processing to add a track to a planar graph;

FIG. 11 is a table of values of non-nearness cost between each planar graph and remaining track data in a first loop;

FIG. 15 is a table of values of non-nearness cost between each planar graph and remaining track data in a second loop;

DESCRIPTION OF EMBODIMENTS

Figure 3A:
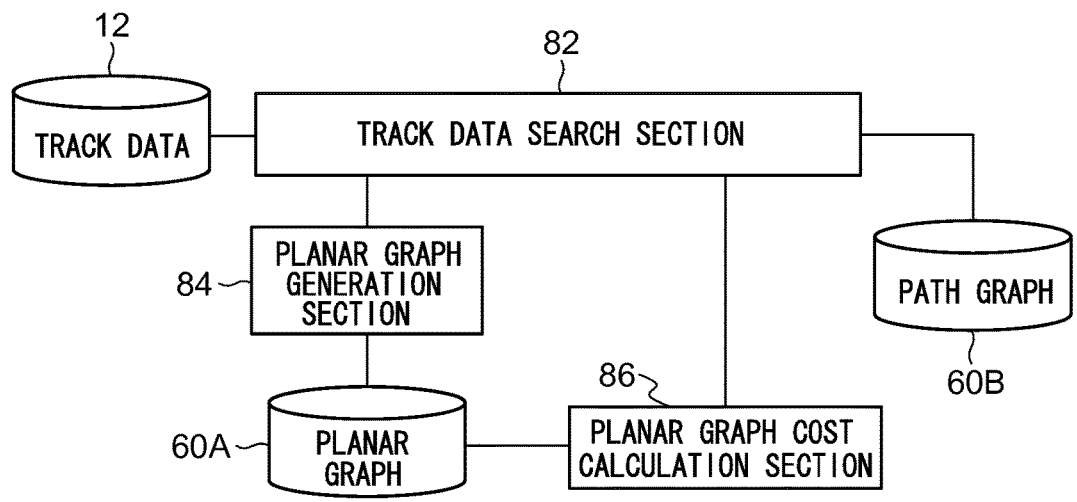
FIG. 3A is a diagram illustrating functional sections of a path model generation program executed by a path model generation device.

Detailed explanation follows regarding an exemplary embodiment of technology disclosed herein, with reference to the drawings.

FIG. 1 illustrates a path model generation system of the present exemplary embodiment. As illustrated in FIG. 1, the path model generation system includes a generation system 16 including a path model generation device 10 and a server 14 including a database 12 stored with track data. As described below, load can be distributed across the server 14 and the path model generation device 10 by allocating processing to receive sensor data and processing to generate track data, and processing to generate a planar graph, to the server 14 and the path model generation device 10, respectively.

In the server 14, sensor data, described below, is periodically transmitted from sensors 32, 34, 36, 38 installed in vehicles 42, 44, 46, 48 through plural, for example four, respective networks 22, 24, 26, 28. Note that the respective numbers of the networks, vehicles, and sensors are not limited to four.

The path model generation device 10 is an example of a planar graph generation device of technology disclosed herein. The vehicles 42 to 48 are examples of moving bodies of technology disclosed herein.

Each of the sensors 32, 34, 36, 38 is installed with a Global Positioning System (GPS) that periodically detects latitude and longitude at which the sensor is positioned. Each of the sensors 32, 34, 36, 38 employs, as the sensor data, data including the periodically detected latitude and longitude, a vehicle number (ID) of the vehicle mounted with the sensor, times such as when the latitude was detected, and additional attribute data. The latitude and longitude data is positional data indicating the position of the vehicle. Note that the timings when the sensors 32, 34, 36, 38 respectively transmit the sensor data are not synchronized with each other.

The server 14 stores, in the database 12, the sensor data transmitted to the server 14 from the sensors 32, 34, 36, 38, respectively by vehicle number (ID), in a state arrayed (sorted) in time sequence. The position where a vehicle was positioned at each detection time is accordingly periodically identified. A relationship (link) between the position where a vehicle was positioned at a given detection time and the position where the vehicle was positioned at the next detection time is thereby identified. Link data representing links between each position are associated to the sensor data by the server 14, and are also stored in the database 12. A track representing the manner in which a vehicle identified by the vehicle number (ID) moved is identified based on the sensor data and link data stored in a sorted state by vehicle number (ID). Data including positional data and link data by vehicle number (ID) is referred to as track data of the vehicle.

Figures 8A, 8B, 8C, 8D:
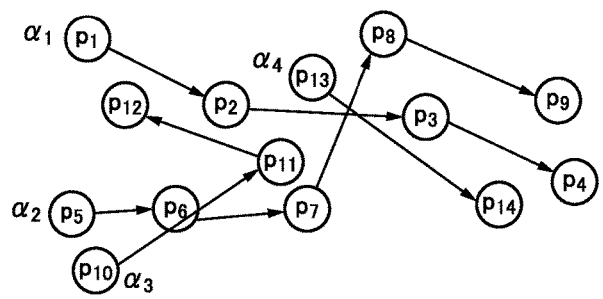
FIG. 8A is diagram illustrating a track data collection T.
FIG. 8B is a diagram illustrating specific position data for four track data $\alpha_1$ to $\alpha_4$.
FIG. 8C is a diagram illustrating a graph in which all determined tracks are notated as they are based on each of the track data $\alpha_1$ to $\alpha_4$.
FIG. 8D is a diagram illustrating a graph in which all the positions of each of the track data $\alpha_1$ to $\alpha_4$ are approximated to a single position.

A collection T of track data is illustrated in FIG. 8. The track data collection T includes plural, for example four, sets of track data $\alpha_1$ to $\alpha_4$. The respective track data $\alpha_1$ to $\alpha_4$ represent the tracks of the vehicles 42, 44, 46, 48. Specific positional data for the four track data $\alpha_1$ to $\alpha_4$ is illustrated in FIG. 8B. For example, the track data $\alpha_1$ includes positional data $p_1, p_2, p_3, p_4$. The sequence $p_1$ to $p_4$ is determined based on the link data. The other track data $\alpha_2$ to $\alpha_4$ also, similarly to the configuration of the track data $\alpha_1$, includes positional data arrayed in sequence by link data.

FIG. 8C illustrates a manner in which all tracks determined based on each of the track data $\alpha_1$ to $\alpha_4$ are notated just as they are. As illustrated in the graph of FIG. 8C, the graph becomes complicated if all of the tracks determined based on each of the track data $\alpha_1$ to $\alpha_4$ are notated just as they are. If path analysis or the like is performed from such complicated track data then this results in a large computation load.

However, for example, as illustrated at the center and slightly below the center of FIG. 8C, the distance is short (less than a specific value) between the position $p_{11}$ and the position $p_7$. The relationship between position $p_{11}$, and position $p_7$ therefore indicates a high possibility that the respectively corresponding vehicles 46, 44 were at the same position as each other. Therefore, approximating the position $p_{11}$ and the position $p_7$ to a single point would not cause a large error to arise in results of path analysis or the like. It is accordingly effective to perform approximation processing of the position $p_{11}$ and the position $p_7$ to a single point, to reduce the computation load for path analysis or the like.

If only reduction in the computation load was considered then, as illustrated in FIG. 8D, approximation of the respective positions of all of the track data $\alpha_1$ to $\alpha_4$ to a single position might also be considered. However, error in position of each of the vehicles 42 to 48 is large in such cases, and large errors arise in path analysis or the like.

An object of the present exemplary embodiment is to reflect the position of each of the vehicles 42 to 48 with as good a precision as possible, and to generate a graph (referred to below as planar graph) of the position of each of the vehicles 42 to 48 that is as simplified as possible. Track data is imported into the path model generation device 10 from the server 14. The path model generation device 10 generates a planar graph, described below, based on the imported track data.

The server 14 and the path model generation device 10 are of similar configuration to each other, and explanation follows regarding the path model generation device 10, with explanation regarding the configuration of the server 14 therefore omitted.

FIG. 2 illustrates a block diagram of the path model generation device 10. As illustrated in FIG. 2, the path model generation device 10 includes a Central Processing Unit (CPU) 52, Read Only Memory (ROM) 54, and memory (Random Access Memory (RAM)) 56, connected together through a bus 58. A secondary storage device 60 and a magnetic disk drive device 64 are also connected to the bus 58. A magnetic disk 62 is mounted in the magnetic disk drive device 64. The path model generation device 10 includes a display controller 66, a display device 68 connected to the display controller 66, an input device 70, and a communication controller 72. The communication controller 72 of the server 14 is connected to the communication controller 72. A planar graph storage region 60A for storing a planar graph, described below, and a storage region 60B for storing a path graph are included in the secondary storage device 60. A liquid crystal display (LCD), a cathode ray tube (CRT), an organic electroluminescence display (OELD), a plasma display panel (PDP), a field effect display (FED), or the like may be employed as the display device 68. A keyboard, a mouse, or the like may be employed as the input device 70.

Function sections of a path model generation program executed by the path model generation device 10 are illustrated in FIG. 3A. The function sections of the path model generation program include a track data search section 82 that is input with track data from the database 12 and searches the track data. The function sections include a planar graph generation section 84 that generates a planar graph based on found track data, and stores the generated planar graph in the storage region 60A. The function sections include a planar graph cost calculation section 86 that calculates the cost (C*), described below, of the planar graph.

The path model generation program is stored in the ROM 54. The CPU 52 reads the path model generation program from the ROM 54, expands the path model generation program into the memory 56, and executes the processes of the path model generation program.

Figure 3B:
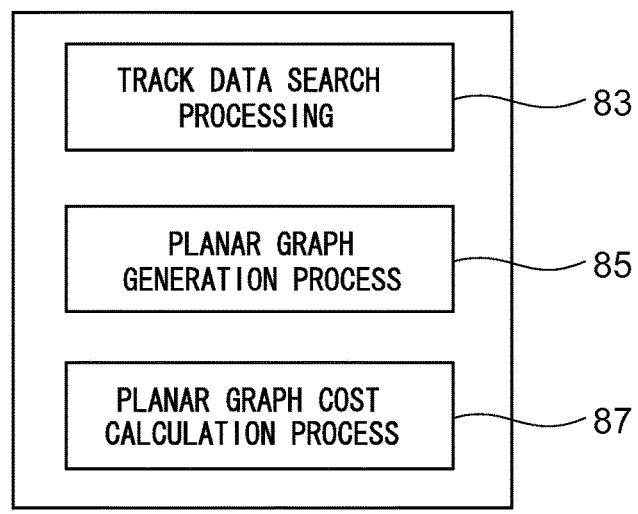
FIG. 3B is a diagram illustrating processes of a path model generation program.

Processes of the path model generation program are illustrated in FIG. 3B. The processes of the path model generation program include a track data search process 83, a planar graph generation process 85, and a planar graph cost calculation process 87.

The CPU 52 operates as each of the sections 82 to 86 illustrated in FIG. 3A by executing each of the processes 83 to 87 illustrated in FIG. 3B.

An example is given here of a case in which the path model generation program is read from the ROM 54; however, there is no need for the path model generation program to be initially stored on the ROM 54. For example, the path model generation program may be first stored on a freely selected "portable storage medium", such as a Solid State Drive (SSD), a DVD disk, an IC card, a magneto optical disk, or a CD-ROM, connected to the path model generation device 10. The path model generation device 10 may also acquire, and execute, the path model generation program from these portable storage media. The path model generation program may also be stored on a storage section of another computer, server device, or the like connected to the path model generation device 10 through a communications line. In such cases, the path model generation device 10 may acquire, and execute, the path model generation program from the other computer, server device, or the like.

FIG. 4 illustrates a flowchart of an example of path model generation processing executed by the path model generation device 10.

As illustrated in the graph of FIG. 8C, if all the tracks determined based on the track data $\alpha_1$ to $\alpha_4$ are notated as they are then a graph is obtained that reflects the position of plural moving bodies with high precision. However, the graph reflecting the position of plural moving bodies with high precision is complicated. There is accordingly a high computation load when performing path analysis or the like from such complicated track data, which is inefficient. If only reduction in the computation load was considered then, as illustrated in FIG. 8D, approximation of the positions of all of the track data $\alpha_1$ to $\alpha_4$ to a single position might also be considered. However, error in position of each of the moving bodies is large in such cases, and large errors arise in path analysis or the like. The path model generation device 10 accordingly executes path model generation processing, and from the track data collection T, reflects the position of each of the vehicles with as good precision as possible, and generates a planar graph in which the position of each of the vehicles is as simplified as possible. The planar graph is configured including data for nodes and data for links between nodes.

Namely, track data is added in sequence one at a time, and during adding, approximation is performed if there are portions capable of performing approximation processing on. This thereby enables the planar graph to be simplified even more.

However, there are portions for which approximation is not possible during approximation processing. In such cases, when an arbitrarily selected track data is added to the planar graph, the position of each of the plural vehicles can be reflected with good precision, however sometimes the obtained planar graph becomes complicated. Conversely, sometimes the obtained planar graph can be simplified, but it is not possible to reflect the position of each of the plural vehicles with good precision.

The present exemplary embodiment employs the path model generation processing to reflect the position of each of the plural vehicles with as good precision as possible, and to obtain a graph in which the position of each of the vehicles is as simplified as possible.

The planar graph is an example of added track data of technology disclosed herein.

When the path model generation processing is started, at step 92, the planar graph generation section 84 initializes variables employed in the path model generation processing. As described below, the planar graph is generated by recording node data (positional data) representing the position of moving bodies (referred to below as nodes) and link data representing links between the nodes in a planar graph G*. The planar graph G* accordingly includes a collection V of node data, and a collection E of link data. At step 92, the collection V and the collection E are emptied. A smallest cost minC, described below, is then set to infinity. At step 92, the track data search section 82 imports from the server 14, and records in the track data collection T, all the track data stored in the database 12.

At step 94, the planar graph generation section 84 determines whether or not the track data collection T is empty. The path model generation process proceeds to step 96 if the track data collection T is not empty, and the path model generation process proceeds to step 106 if the track data collection T is empty.

At step 96, the planar graph generation section 84 searches the track data collection T for track data $\alpha^*$ for which cost can be most reduced, and a cost C* for that time. The cost C* is an example of a specific value of technology disclosed herein.

Specific content of the processing in step 96 is described below, however explanation first follows regarding the cost C*.

Figure 19:
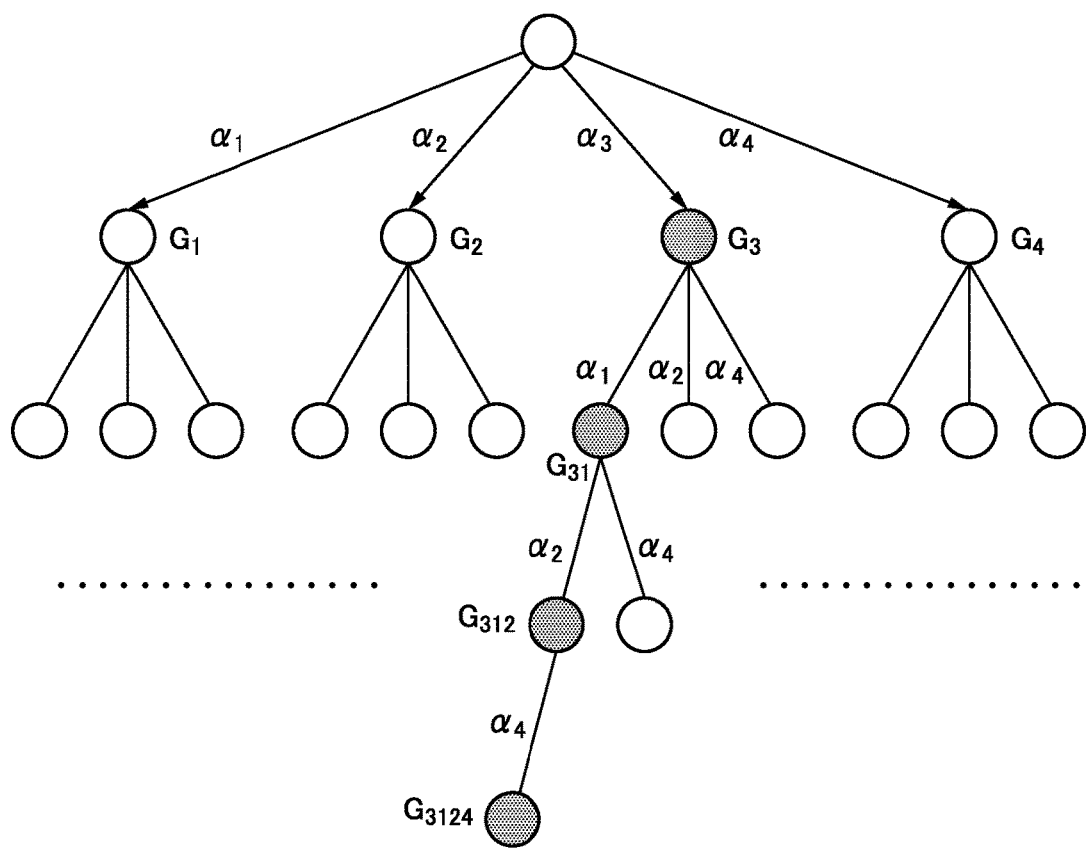
FIG. 19 is a schematic diagram illustrating an approach by which the planar graph is produced.

FIG. 19 is a schematic diagram illustrating an approach by which the planar graph is obtained by adding all the track data. The planar graph generation section 84 first generates intermediate planar graphs $G_1$ to $G_4$ using respective tracks based on all the track data $\alpha_1$ to $\alpha_4$. Note that the intermediate planar graphs at this stage match the corresponding track data. Then, the planar graph cost calculation section 86 computes in the planar graphs $G_1$ to $G_4$ a summed cost C* of a cost of complexity, and a cost of non-nearness to each track based on the remaining track data other than the track data employed to generate the given track. For example, cost C* is computed in the planar graph $G_1$ based on the track data $\alpha_1$ by summing the cost of complexity, and the cost of non-nearness to the tracks respectively based on the track data $\alpha_2$ to $\alpha_4$ other than the track data $\alpha_1$. The planar graph having the minimum cost C* is selected from out of the intermediate planar graphs $G_1$ to $G_4$. For example, the intermediate planar graph $G_3$ is selected. Then the planar graphs $G_{31}$, $G_{32}$, $G_{34}$ are generated by adding each of three tracks based on the remaining track data $\alpha_1$, $\alpha_2$, $\alpha_4$, to the selected planar graph $G_3$. The cost C* is then computed for each of the generated planar graphs. The planar graph having the minimum cost C* is selected from out of the intermediate planar graphs $G_{31}$, $G_{32}$, $G_{34}$. For example, the planar graph $G_{31}$ is selected. Processing similar to the above is performed in sequence. Finally, the tracks of all the track data are superimposed to generate the planar graph.

As described above, the reason the present exemplary embodiment adds track data one at a time is the following. In theory, an approach might be considered in which planar graphs were generated for all combinations in order to generate an optimum planar graph that reflects vehicle position with good precision and simplicity. However, when there are a large number of tracks, the computation load increases. Thus in the present exemplary embodiment, by selecting the combination with the minimum cost C* when superimposing tracks one at a time, the computation load is reduced by restricting the candidates of tracks to be superimposed. Thus a final planar graph can still be generated with a comparatively small computation load even if there are a large number of track data sets.

The cost C* here is, as described above, a value from summing a cost $\Sigma_{\alpha \in T} \delta(G, \alpha)$ of non-nearness, and a cost |G| of complexity. Namely, the cost C* is cost $\Sigma_{\alpha \in T} \delta(G, \alpha) + |G|$. $\delta(G, \alpha)$ is an example of a value representing non-nearness in the technology disclosed herein. |G| is an example of a value representing complexity in technology disclosed herein.

Explanation first follows regarding the non-nearness cost $\Sigma_{\alpha \in T} \delta(G, \alpha)$.

As described below, each of the intermediate planar graphs is generated by adding track data ($\alpha$) not in a given planar graph (G) of the collection T, to the given planar graph (G). The $\delta(G, \alpha)$ is a value expressing the non-nearness amount between tracks based on the planar graph (G) and the track data ($\alpha$) respectively. Namely, the greater $\delta(G, \alpha)$, the greater the non-nearness amount between tracks based on the given planar graph (G) and the given track data ($\alpha$) respectively. Conversely, if, for example, tracks based on the given planar graph (G) and the given track data ($\alpha$) respectively completely match, then $\delta(G, \alpha)$ becomes 0. Moreover, in cases in which the tracks based on the given planar graph (G) and the given track data ($\alpha$) respectively are near to each other (within a specific distance), the $\delta(G, \alpha)$ becomes 0. As described below, portions of the tracks positioned within a specific distance are approximated, such that both tracks match each other. Portions of the tracks positioned within a specific distance of each other are referred to as being in an approximation range.

Figure 10A:
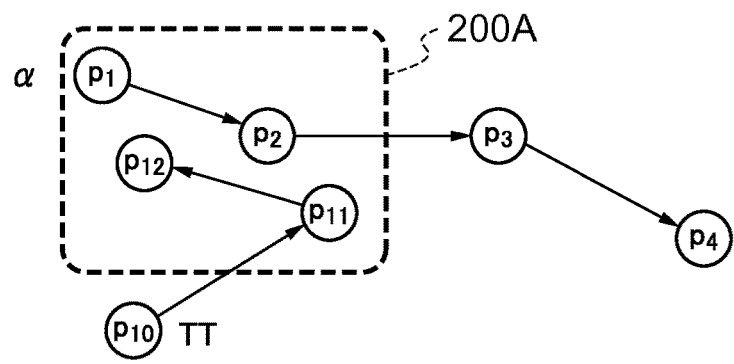
FIG. 10A is a diagram illustrating a situation in which a given track and another track have an approximation range where distance is near, and a non-approximation range.

However, sometimes a path ($\pi$) on a given planar graph (G) and given path data ($\alpha$) has a near (within a specific distance) portion (approximation range) and a far (exceeding the specific distance) portion (non-approximation range). FIG. 10A illustrates a situation in which there is an approximation range 200A and a non-approximation range on a given path ($\pi$) on the planar graph (G) and given track data ($\alpha$). In such a case, as described above, the cost of the non-nearness becomes 0 for the approximation range 200A. This is because the portions in the approximation range are near and so the tracks match each other. However, the non-approximation range is portions of the given path ($\pi$) and the given track data ($\alpha$) that are not near to each other on the planar graph (G). The number (two) of the nodes ($p_3$, $p_4$) present on the path and the track in the non-approximation range may be employed as a physical quantity representing the non-nearness amount of these non-approximated portions. The number of links between the nodes present in the non-approximation range and the total length of such links may be employed as the physical quantity. Moreover, a circle of specific surface area may be imagined at all the nodes present in the non-approximation range, rectangles having length directions centered on the axes of each of the links imagined in cases in which links are present, and the total surface area of these imaginary circles and rectangles employed as the physical quantity. In addition, the distance between the most separated nodes from the nodes present in the non-approximation range may be employed as the physical quantity. Moreover, a combination from the above may be employed as the physical quantity. Explanation follows in which the number of nodes is employed as the non-nearness cost.

The non-nearness cost $\Sigma_{\alpha \in T} \delta(G, \alpha)$ is a total value of physical quantity $\delta(G, \alpha)$ representing the non-nearness amount between the planar graph (G), and all the respective track data ($\alpha$) other than the track data employed to generate the planar graph (G).

Thus the track data ($\alpha$) not near to the other remaining tracks is identified from the magnitude of the non-nearness cost E (G, $\alpha$). Thus considering track data ($\alpha$) with small non-nearness cost $\Sigma_{\alpha \in T} \delta(G, \alpha)$, the track based on the obtained track data will contain many approximated portions if other track data are added to this planar graph (G). Thus the obtained planar graph is simplified. At the approximated portions, vehicles can be determined to be positioned in the same position. Namely, the obtained planar graph reflects the vehicle positions with better precision. Thus considering planar graphs (G) with a small non-nearness cost $\Sigma_{\alpha \in T} \delta(G, \alpha)$ and generating the planar graph enables part of the object of the exemplary embodiment to be achieved.

Explanation next follows regarding the complexity cost |G|. The complexity cost |G| is a value representing the level of complexity of the respective planar graphs $G_1$ to $G_4$. If a vehicle moves to many positions, then the number of nodes, number of links, and the total length of the links increases accordingly. Thus the number of nodes, the number of links, or the total length of the links, or a combination therefrom, may be employed as the complexity cost |G|. In the following explanation an example is given in which the number of nodes is employed as the complexity cost |G|. Generating the planar graph in consideration of the complexity cost |G| enables the remaining objective of the present exemplary embodiment to be achieved.

As described above, the cost C* is the value of the summed non-nearness cost $\Sigma_{\alpha \in T} \delta(G, \alpha)$ and complexity cost |G|. In the present exemplary embodiment the planar graph is generated in consideration of the cost C*. As described above, when the non-nearness cost $\Sigma_{\alpha \in T} \delta(G, \alpha)$ is low, then a planar graph can be generated that reflects the position of each of the plural moving bodies with as good precision as possible. However, sometimes the planar graph is still complicated even if there are a lot of approximation processed portions. Thus the complexity cost |G| is required in order to generate a planar graph that simplifies the positions of the respective moving bodies as much as possible. Accordingly, in the present exemplary embodiment, the cost C* is employed that is a value of the summed non-nearness cost $\Sigma_{\alpha \in T} \delta(G, \alpha)$ and the complexity cost |G|.

In the above step 96, the track data ($\alpha$) corresponding to the planar graph with small cost C* is selected from out of the intermediate planar graphs $G_1$ to $G_4$ illustrated in FIG. 19. For example, the track data $\alpha_3$ corresponding to the planar graph $G_3$ is employed as the track data $\alpha$*.

At step 98, the planar graph generation section 84 determines whether or not the cost C* is smaller than minC. The path model generation process proceeds to step 100 if the cost C* is determined to be smaller than minC.

At step 100, the planar graph generation section 84 adds the track data $\alpha$* to the planar graph G* to obtain a new planar graph G*. In the above example, since the track data $\alpha_3$ is employed as the track data $\alpha$*, the planar graph $G_3$ is generated (see also FIG. 19).

At step 102, the planar graph generation section 84 updates the operation variables. More specifically, the planar graph generation section 84 eliminates the track data $\alpha$* from the track data collection T. Thus in the above example, the track data $\alpha_1$, $\alpha_2$, $\alpha_4$ remain in the collection T. At step 102, the planar graph generation section 84 also sets C* as the minC. The path model generation processing then proceeds to step 94.

In the path model generation processing as described above, a single track data $\alpha$* is added to the planar graph G* by making the initial loop (the first time loop) of the processing (94 to 102). Namely, in the above example the track data $\alpha_3$ is added as the track data $\alpha$* to the planar graph G*. The nodes of the track data $\alpha_3$ are not approximated and are added as they are to the planar graph G*. The track of the planar graph G* is accordingly equivalent to the track based on the planar graph $G_3$ (see FIG. 9C).

Explanation next follows regarding specific content of processing of the above step 96. FIG. 5 illustrates an example of track data $\alpha$* search processing (step 96) to search for track data $\alpha$* as a flowchart.

At step 112, the planar graph generation section 84 initializes the operation variables. More specifically, the planar graph generation section 84 sets the smallest cost minC to infinity, and sets the smallest track data $\alpha$* to none (null).

At step 114, the planar graph generation section 84 determines whether or not processing has been completed for all the track data $\alpha$ in the track data collection T. Namely, a variable is employed to identify each of the track data in the track data collection T, and the variable is increased by one for each repeated execution of steps 114 to 118 (120). Determination is made as to whether or not the value of the variable has reached the total number of the track data sets in the collection T. The track data $\alpha$* search processing proceeds to step 122 if the determination result of step 114 is affirmative determination.

However, the track data $\alpha$* search processing proceeds to step 116 if the determination result of step 114 is negative determination.

At step 116, the planar graph generation section 84 adds the track data $\alpha$ to the planar graph G* and generates the planar graph G The track data $\alpha$ is substituted with other track data in the collection T for each repeated execution of step 116. At step 117, the planar graph generation section 84 adds track data collection T−{$\alpha$} to the planar graph G, and computes the cost C at that time. At step 118, the planar graph generation section 84 determines whether or not the cost C is smaller than the minC. The track data $\alpha$* search processing returns to step 114 if the determination result of step 118 is negative determination. However, the track data $\alpha$* search processing proceeds to step 120 if the determination result at step 118 is affirmative determination.

Detailed explanation is given below regarding the processing of steps 114 to 120, however, a brief explanation is given here regarding this processing. Firstly, there is nothing defined in the planar graph G* when the path model generation processing (see FIG. 4) is started. This is equivalent to the path model generation processing being positioned at the top edge in FIG. 19. The planar graph having the smallest cost C* is determined from the planar graphs $G_1$ to $G_4$ corresponding to the track data $\alpha_1$ to $\alpha_4$. This determination is corresponds to determination of which route to select from the top edge of FIG. 19.

The planar graphs $G_1$ to $G_4$ are generated in sequence corresponding to the respective track data $\alpha_1$ to $\alpha_4$ for each repetition of step 116. The cost C* is computed in sequence for the respective planar graphs $G_1$ to $G_4$ for each repetition of step 117.

The reason there is both the planar graph G* and the planar graph G is as follows. The planar graph finally desired to be generated as described above is generated by recording nodes and links in the planar graph G*. As described above, the cost C* is computed in order to determine which track data is preferably added to the planar graph G*. The planar graph G* is not overwritten, and the planar graph G is employed in place of the planar graph G* in order to determine whether or not the cost C* is at the minimum when whichever track data is added to the track data present in the planar graph G*. Thus, at step 116 and step 117, the track data in the planar graph G* is recorded in the planar graph G, and the planar graph G is employed to execute the processing of step 116 and step 117.

Explanation next follows regarding specific content of the processing of step 116. FIG. 6 is an example of track adding processing to add track data to the planar graph, illustrated as a flowchart.

At step 132 of FIG. 6, the planar graph generation section 84 sets the node p, described below, to nil (null), initializes the node s to the start point of the track data $\alpha$, and initializes the cost variable A to zero. The node p is the node one prior to the node s in the track data $\alpha$.

At step 134, the planar graph generation section 84 detects portions of the track in the planar graph G, and of respective tracks based on the track data $\alpha$ to be added to the tracks that are portions having a Frechet distance to each other that match within a specific value $\varepsilon$. Namely, the planar graph generation section 84 calculates a track with a start point of the node s of a matching portion in the track data $\alpha$, and a path $\pi$ of the matching portion in the planar graph G The planar graph generation section 84 sets s and g respectively as the start point and the end point of the track having a start point of node s of the matching portion in the track data $\alpha$. The planar graph generation section 84 sets t and h respectively as the start point and the end point of path $\pi$.

The processing of step 134 above is now explained with reference to FIG. 10B. In the present exemplary embodiment, a Frechet Distance algorithm is employed in order to find a portion where portions of the planar graph G and of the track data $\alpha$ are within the specific value $\varepsilon$. This approach is adopted because employing a Frechet Distance algorithm enables computation of distance of a path in a planar graph to be performed quite efficiently. More specifically the following processing is executed.

Figure 10B:
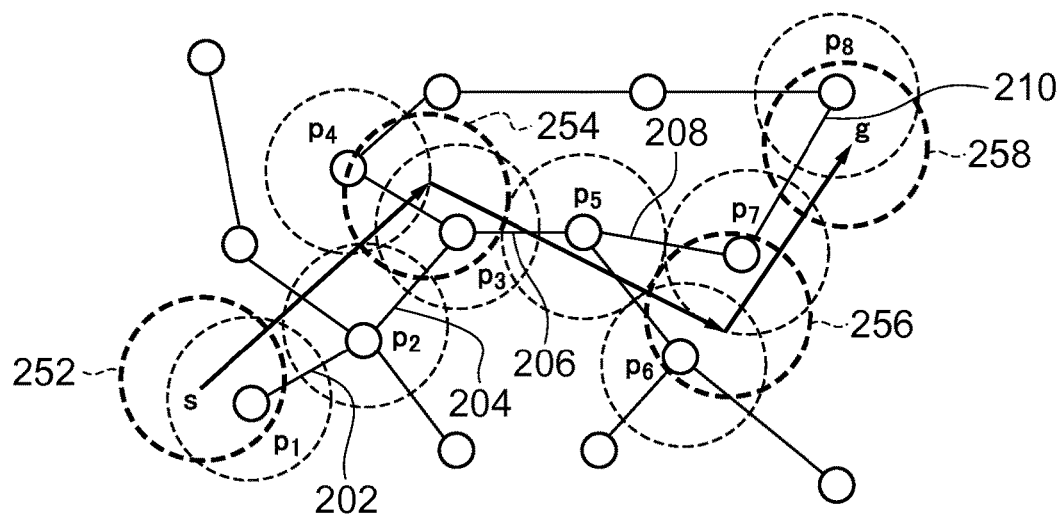
FIG. 10B is a diagram illustrating an example of a method to detect a portion where the distance between a track in planar graph G* and a track based on track data $\alpha$ is within $\varepsilon$.

FIG. 10B illustrates a method to detect a matching portion where portions of the planar graph G and of the respective track data $\alpha$ to be added to the planar graph have a Frechet Distance between each other that is within the specific value $\varepsilon$. In FIG. 10B track data to be added to the planar graph is illustrated as a track from a node s to a node g. In FIG. 10B, a path positioned within the specific value $\varepsilon$ to the track (node s to node g) is illustrated as a path having a start point of node $p_1$ to an end point of node $p_8$. The path from node $p_1$ to node $p_8$ is specifically derived as follows.

Namely, the node $p_1$ within a circle 252 centered on the node s is first derived. Then a search is made for a continuation node linked to the node $p_1$ having a circle centered on the node that intersects with the path (see the arrow from the node s). This search obtains the continuation node $p_2$ linked to the node $p_1$ by a link 202. Sequentially repeating this processing finds links 202 to 210, and nodes $p_3$, $p_4$, $p_5$, $p_6$, $p_7$. Finally the node $p_8$ is obtained contained within the circle 258 of node g. The path $\pi(p_1, p_2, p_3, p_5, p_7, p_8)$ is thereby obtained that has a Frechet Distance to the track data to be added to the planar graph within the specific value $\varepsilon$ on the planar graph G The computed amount of this algorithm is proportional to the product of the track length and the graph size.

In the above example a Frechet Distance algorithm is employed. However, a Euclid distance may be employed.

At step 136, the planar graph generation section 84 determines for the node s whether a path $\pi$ is not present by determining whether or not a node of planar graph G (the node corresponding to the node $p_1$ in FIG. 10B) is not obtained that is within the circle 252 centered on the node s. The track adding processing proceeds to step 138 if the determination result at step 136 is affirmative determination, and the track adding processing proceeds to step 144 if the determination result at step 136 is negative determination.

Figure 10C:
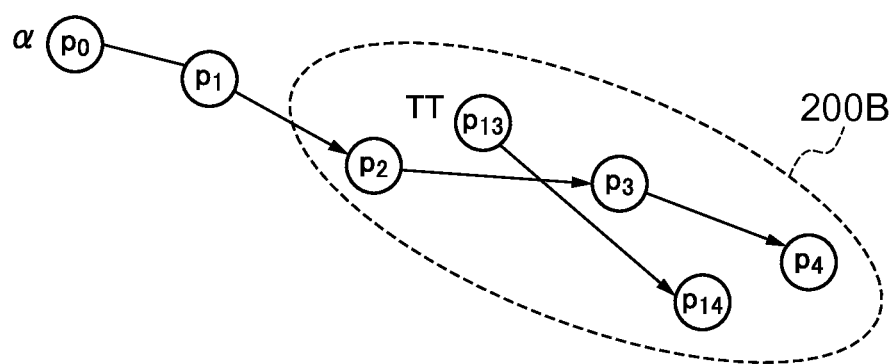
FIG. 10C is a diagram illustrating superimposed tracks of a track based on track data $\alpha$ and a path $\pi$.

Explanation follows regarding subsequent processing, with reference to FIG. 10C. FIG. 10C illustrates a track in which the track based on the track data $\alpha$ (node $p_0$ to $p_4$) and the path $\pi$ (nodes $p_{13}$ to $p_{14}$) are superimposed. In FIG. 10C, a range in which portions of the path and the track have a Frechet Distance within the specific values of each other is illustrated as an approximation range 200B. As described below, nodes $p_3$, $p_4$ within the range of the approximation range 200B are approximated.

At step 138, the planar graph generation section 84 determines whether or not node p≠nil. If node p≠nil then the planar graph generation section 84 adds node p to the node collection V of the planar graph G, and adds link (p, s) to the link collection E of the planar graph G. The planar graph cost calculation section 86 increases the cost variable by one.

The node p is the node one previous to the node s. When initially executing the track adding processing, the node $p_0$ is employed as the node s at step 134. Thus the node p is nil (null). Step 138 is accordingly skipped during initial execution of the track adding processing.

Next at step 140, the planar graph generation section 84 employs the node s as the node p, and employs the node immediately following the node s on the track $\alpha$ as the node s. At step 140, when initially executing the track adding processing, node p=node $p_0$ for the node p. Node s=node $p_1$ for the node s. At step 142, the planar graph generation section 84 determines whether or not the node s is the final point on the track $\alpha$ (node $p_4$). The track adding processing is ended if determined that the node s is the final point on the track $\alpha$ (node p4) and processing transitions to the processing of step 117 in FIG. 5. In the case of this example, the node $p_1$ is employed as the node s, and so the determination result of step 142 is negative determination. The track adding processing returns to step 134 in such a case.

At the next stage, the processing of step 134 is executed with node $p_1$ employed as the node s. As illustrated in FIG. 10C, a path $\pi$ is not present for node s (=node $p_1$). Affirmative determination is accordingly made at step 136. As described above, at this stage the node p=$p_0$. Node p≠nil is accordingly determined at step 138. The node p (=node $p_0$) is accordingly added to the node collection V of the planar graph G The link (p, s)=link ($p_0$, $p_1$) is also added to the link collection E of the planar graph G. In the above manner, the node $p_0$ is outside the approximation range. A value representing the non-nearness of the track a and the planar graph G is, in this case, the number of the nodes outside of the approximation range. The cost variable A for computing the value representing the nearness is increased by one. At this stage, the existing planar graph (including the path π), the node $p_0$, and the link from node $p_1$ to node $p_1$ is generated as the planar graph.

Next at step 140, node s=node $p_1$ for the node p this time. The node $p_2$ is employed as the node s. At this stage the determination result of step 142 is negative determination. A path π is present when step 134 is executed with node $p_2$ employed as node s, and so the start point s of the track is node $p_2$ and the end point g is the node $p_4$, and the start point t of the path π is node $p_{13}$ and the end point g is the node $p_{14}$. Negative determination is made at step 136 when the node $p_2$ is employed as the node s, and at step 144 determination is made as to whether or not node p≠nil. If the node p nil then the planar graph generation section 84 adds the node p to the node collection V of the planar graph G, and adds the link (p, s) and the link (s, t) to the link collection E of the planar graph. As described above, the node $p_1$ is employed as the node p, and so node p≠nil. The node p=node $p_1$ is accordingly added to the node collection V of the planar graph G The link (p, s)=link ($p_1$, $p_2$) and the link (s, t)=link ($p_2$, $p_{13}$) (see link 260 of FIG. 10) are added to the link collection E of the planar graph. The planar graph cost calculation section 86 increases the cost variable A by two for a similar reason to that given above.

At the next step 148, the planar graph generation section 84 determines whether or not the node g is the end point of the track α. If the node g is not the end point of the track a then processing returns to step 134. However, in the above example, the node g is the end point $p_4$ of the track α. Affirmative determination is accordingly made as the determination result of step 148. Processing transitions to step 117 of FIG. 5.

Figure 10D:
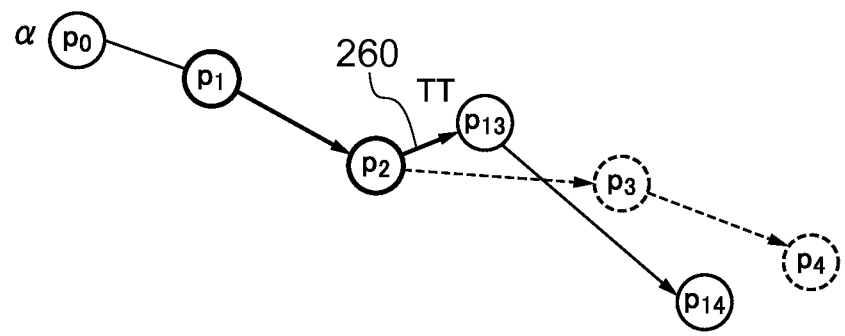
FIG. 10D is a diagram illustrating approximated tracks of a track based on track data $\alpha$ and a path $\pi$.

When the track adding processing has been ended, the planar graph in the above example includes, as illustrated in FIG. 10D, a path 7E, and a portion up until nodes $p_0$, $p_1$, $p_2$, $p_{13}$. The nodes $p_3$, $p_4$ that were in the approximation range 200B are approximated to the nodes $p_{13}$, $p_{14}$ of the path π. The cost variable A (=δ) is 2 (nodes $p_0$, $p_1$).

As the approximation method in the approximation range 200B, in the above example, the nodes $p_3$, $p_4$ of the track data α are approximated to the nodes $p_{13}$, $p_{14}$ on the path π on the existing planar graph. Thus a new planar graph (added track data) is generated by adding the nodes $p_0$, $p_1$, $p_2$, the link ($p_0$, $p_1$), the link ($p_1$, $p_2$), and the link ($p_2$, $p_{13}$) (see link 260) to the existing planar graph.

However, the approximation processing method is not limited to such a method, and there are also the following two methods. First, the nodes $p_{13}$, $p_{14}$ on the path π may be approximated to the nodes $p_3$, $p_4$ of the track data α. In such cases, the planar graph becomes the connection track of nodes $p_0$, $p_1$, $p_2$, $p_3$, $p_4$. Second, the node $p_{13}$ on the path π and the node $p_3$ of the track data α may be approximated to an intermediate point (a first intermediate point), and similarly, the node $p_{14}$ and the node $p_4$ may be approximated to an intermediate point (a second intermediate point). In such cases, the planar graph becomes the connection track of nodes $p_0$, $p_1$, $p_2$, first intermediate point, second intermediate point.

Figure 7:
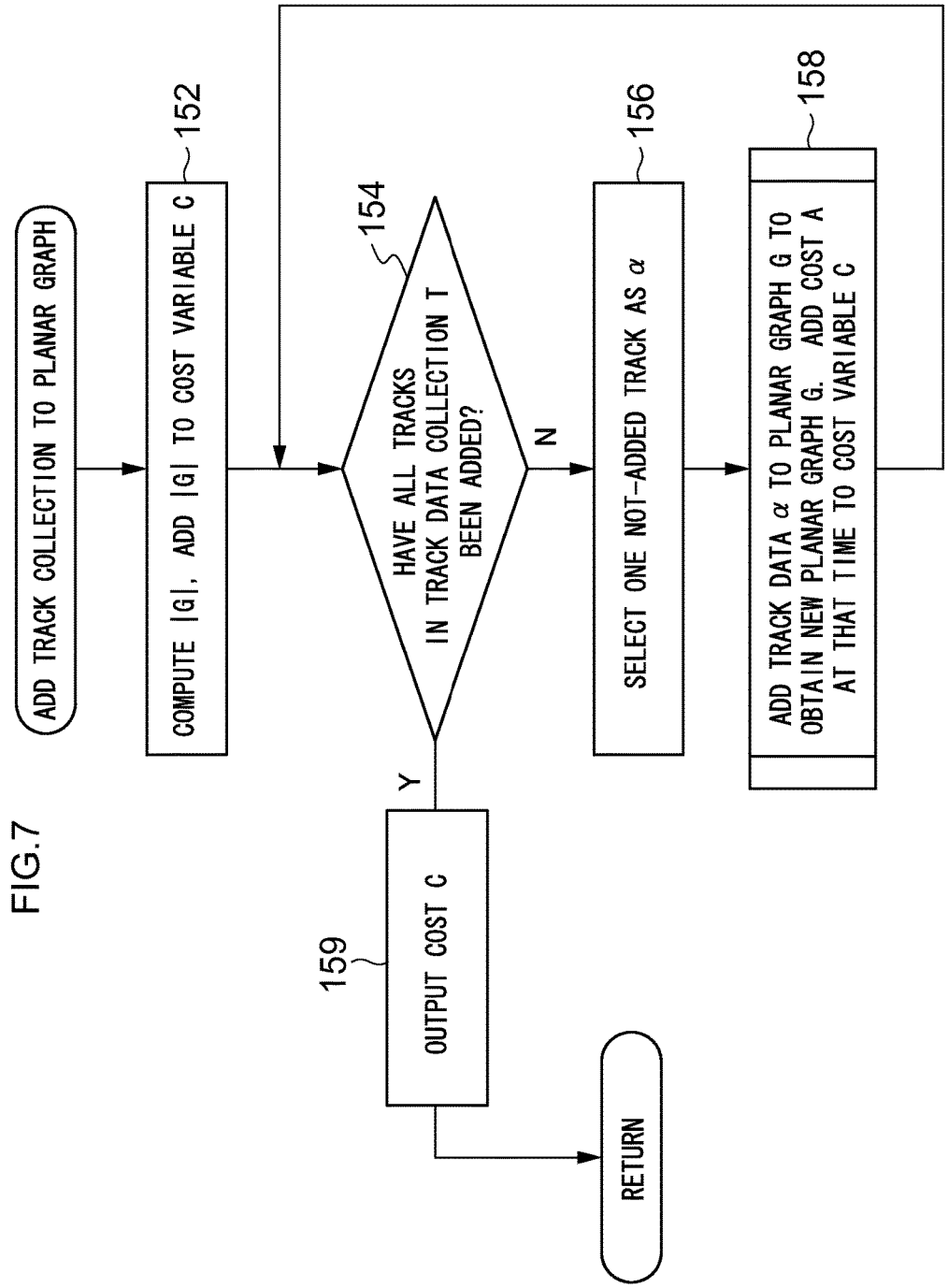
FIG. 7 is a flowchart illustrating an example of track collection adding processing to add a track collection to a planar graph.

FIG. 7 illustrates, as a flowchart, an example of track collection adding processing to add a track collection to the planar graph G of step 117 of FIG. 5.

Figure 9A:
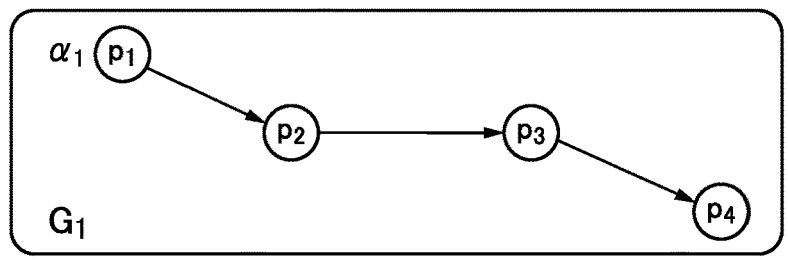
FIG. 9A is a diagram illustrating tracks based on track data $\alpha_1$.

At the initial processing stage of FIG. 5, for example with track data $α_1$ as an example, at step S116 of FIG. 5, the track data $α_1$ is present in the planar graph G The track based on the planar graph G (the track data $α_1$) is as illustrated in FIG. 9A. Note that step S116 is repeated after the processing of step 118 or step 120. The track data $α_2$ to $α_4$ are accordingly added in sequence to the planar graph G.

At each sequential repetition of step 117, for example with track data $α_1$ as an example, all of the other track data $α_2$ to $α_4$ other than the track data $α_1$ are accordingly added in sequence to the planar graph G (the track data $α_1$).

At step 152 of FIG. 7, the planar graph generation section 84 computes the complexity cost |G| of the planar graph G, initializes to zero a cost variable C to sum the complexity cost and the non-nearness cost, and adds the complexity cost |G| to the cost variable C. At step 154, the planar graph generation section 84 determines whether or not track data in the track data collection T has all been added. If the determination result of step 154 is affirmative determination then the track collection adding processing is ended after the processing of step 159, and processing proceeds to step 118 of FIG. 5. The track collection adding processing transitions to step 156 if the determination result of step 154 is negative determination. At step 156, the planar graph generation section 84 selects one non-added track as the track data α, and at step 158, the planar graph generation section 84 adds the track data α to the planar graph G to obtain a new planar graph G. A cost A is added to the cost variable C at this point in time. Specific contents of the processing of step 158 are the processing of FIG. 6 explained above.

At the initial stage of processing of FIG. 5, for example with track data $α_1$ as an example, as described above, a planar graph $G_1$ of the track data $α_1$ is generated corresponding to the track illustrated in FIG. 9A as the processing result of step 116 of FIG. 5. In this state, when step 117 is executed, the track data $α_2$ to $α_4$ are sequentially added to the planar graph $G_1$ (track data $α_1$) illustrated in FIG. 9A, and the cost is computed by the track adding processing of FIG. 6. The non-nearness costs in such a case are listed in the row corresponding to $G_1$ in FIG. 11. At step 159, the planar graph generation section 84 outputs cost C so as to be usable as the cost C.

Figure 9B:
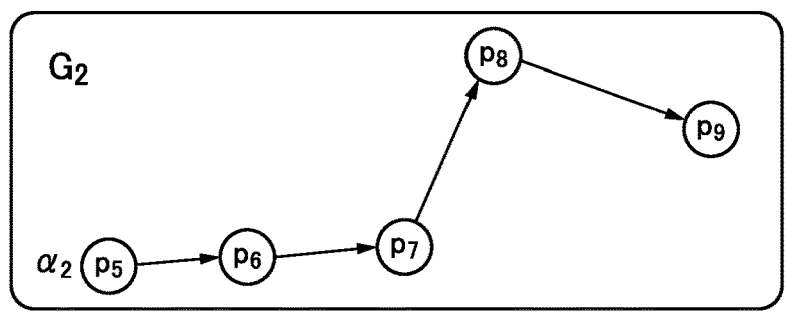
FIG. 9B is a diagram illustrating tracks based on track data $\alpha_2$.

For example, the planar graph $G_1$ (FIG. 9A) and the track based on track data $α_2$ (FIG. 9B) are not in an approximation range. Therefore the number of all of the nodes (5) of the track data $α_2$ is computed as the non-nearness cost.

For the planar graph $G_1$ (FIG. 9A) and the track data $α_3$ (FIG. 9C), the node $p_2$ of the planar graph $G_1$ and the node $p_{11}$ of the track data $α_3$ are within the approximation range. Therefore the number of nodes in the nodes of the track data $α_3$ other than the node $p_{11}$ (2) is computed as the non-nearness cost.

For the planar graph $G_1$ (FIG. 9A) and the track data $α_4$ (FIG. 9D), the node $p_3$ of the planar graph $G_1$ and the node $p_{13}$ of the track data $α_4$, and the node $p_4$ of the planar graph $G_1$ and the node $p_{14}$ of the track data $α_4$, are each within the respective approximation ranges. Therefore the number of nodes in the nodes of the track based on the track data $α_4$ other than the nodes $p_{13,14}$ (0) is computed as the non-nearness cost.

The above is the non-nearness cost, and is included, with the complexity cost, in computation of the cost variable C. The final cost C in such a case is 11.

Next, at step 118 (FIG. 5) determination is made as to whether or not the cost C is smaller than the minC. The minC was set at infinity at step 112, and so at the first execution of the processing of FIG. 5 (step 114 to step 117), the cost C=11<minC=infinity, and affirmative determination is made at step 118. The track data α* search processing proceeds to step 120 if the determination result of step 118 is affirmative determination. At step 120, the planar graph generation section 84 updates the operation variables.

Namely, the planar graph generation section 84 sets the cost C (11) as the minC, and sets the track data having the smallest cost at the current stage as the track data $\alpha^*$.

After step 120, the track data $\alpha^*$ search processing proceeds to step 114. This time the processing of steps 116, 117 is executed with the track data $\alpha_2$ as the track data $\alpha$. The collection T–$\alpha$ of step 117 is the track data $\alpha_1$, $\alpha_3$, $\alpha_4$. The computation results of the above non-nearness costs are listed in the row corresponding to planar graph $G_2$ of FIG. 11. The complexity cost of planar graph $G_2$ is 5. Thus the final cost C is 4+1+2+5=12. The minC is 11 as described above. Thus negative determination is made as the determination result of step 118, and the track data $\alpha^*$ search processing returns to step 114.

This time the processing of steps 116, 117 is executed with the track data $\alpha_3$ as the track data $\alpha$. The results, the non-nearness costs, are listed in the row corresponding to planar graph $G_3$ of FIG. 11. The complexity cost of planar graph $G_3$ is 3. Thus the final cost C is 3+2+1+3=9, and the determination result of step 118 is affirmative determination. Step 120 is executed, 9 is set as the minC, and $\alpha_3$ is set as the track data $\alpha^*$.

Then the processing of steps 116, 117 is executed with the track data $\alpha_4$. As a result, the non-nearness costs are the values listed in the row corresponding to planar graph $G_4$ of FIG. 11. The complexity cost of planar graph $G_4$ is 2, the final cost C is 10, and the determination result of step 118 is negative determination. Step 120 is accordingly skipped, and the track data $\alpha^*$ search processing returns to step 114. At this stage the determination result of step 114 is affirmative determination, and the track data $\alpha^*$ search processing proceeds to step 122.

At step 122, the planar graph generation section 84 outputs the track data $\alpha^*$ having the smallest cost, and the smallest cost minC. In the above example the smallest track data $\alpha^*$ is $\alpha_3$, and the minC is 9. This is cost C*.

The track data $\alpha^*$ search processing is ended when step 122 has been executed, and processing transitions to step 98 of FIG. 4.

When the processing of FIG. 4 was initially executed, namely at the stage when track data had not yet been defined in the planar graph G*, the path model generation processing proceeds to step 100 since cost C*<minC(=infinity).

Figure 9C:
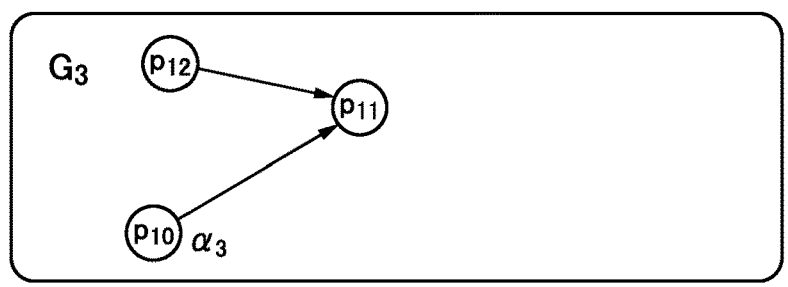
FIG. 9C is a diagram illustrating tracks based on track data $\alpha_3$.
Figure 9D:
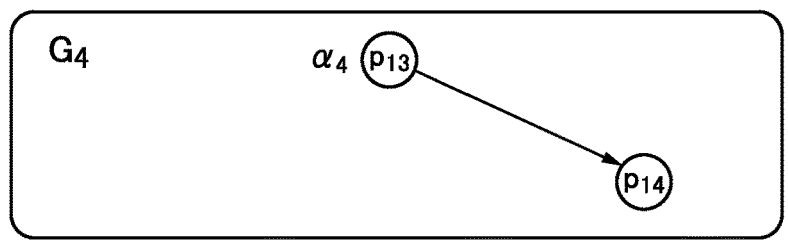
FIG. 9D is a diagram illustrating tracks based on track data $\alpha_4$.

At step 100, the planar graph generation section 84 adds the track data $\alpha^*$, the track data $\alpha_3$ in the above example, to the planar graph G*. A new planar graph G* is thereby obtained. The track in such a case is as illustrated in FIG. 9C. This stage is the stage in which the planar graph $G_3$ is generated as the planar graph G* in the stage one below the top edge of FIG. 19.

The track data $\alpha^*$ ($\alpha_3$) is thereby added to the planar graph G*. In order that the track data $\alpha^*$ is not re-added to the planar graph G*, at step 102 the planar graph generation section 84 deletes the track data $\alpha^*$ from the track data collection T.

The planar graph generation section 84 sets the cost C* as the minC. At this stage there are the track data $\alpha_1$, $\alpha_2$, $\alpha_4$ present in the collection T. The determination result of step 94 is accordingly negative determination. The path model generation processing proceeds to step 96, and enters the loop for the second time.

Figure 12A:
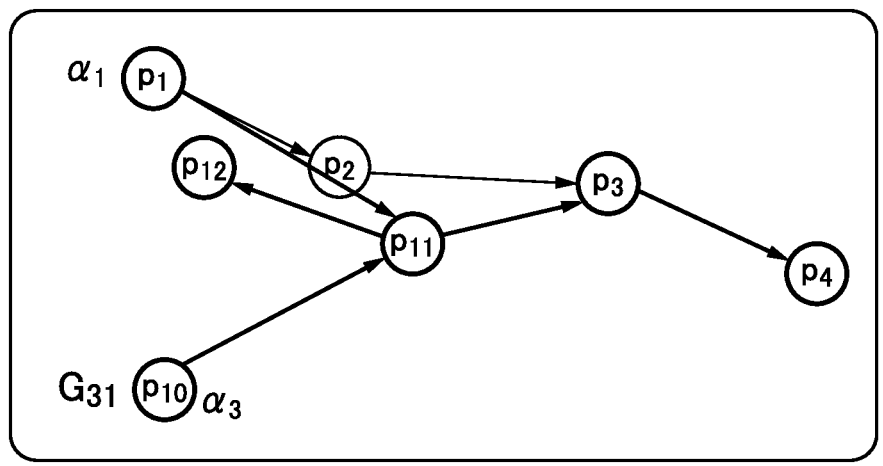
FIG. 12A is a diagram illustrating tracks of a planar graph $G_{31}$ in which track data $\alpha_1$ has been added to planar graph $G_3$.

At step 96 of the second loop, execution employs the planar graph $G_3$ as the planar graph G*. More specifically, the planar graph that resulted from adding the track data $\alpha_1$ to the planar graph G* is generated as the planar graph G ($G_{31}$) (step 116 (see FIG. 5)). The track of the planar graph $G_{31}$ is as illustrated in FIG. 12A. As illustrated in FIG. 12A, in the planar graph $G_{31}$, the node $p_2$ in the track data $\alpha_1$ and the node $p_{11}$ in the planar graph $G_3$ approximate to each other.

The remaining track data $\alpha_2$ (see FIG. 12B) and track data $\alpha_4$ (see FIG. 12C) are added to the planar graph $G_{31}$ and the costs are computed (step 117 (see FIG. 5)). The non-nearness costs in such a case are respectively 2 and 0, as illustrated in the row corresponding to the planar graph $G_{31}$ of FIG. 15.

Figure 12B:
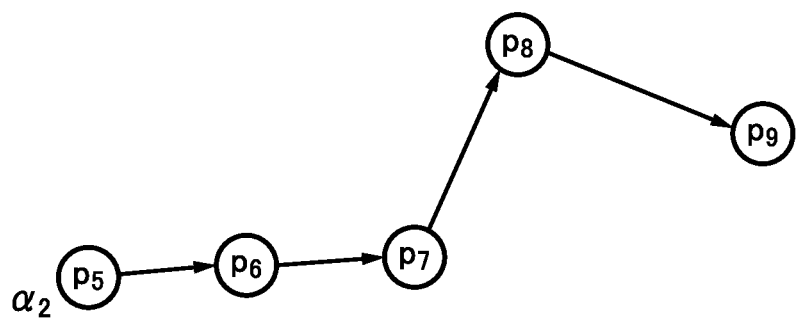
FIG. 12B is a graph illustrating track data based on track data $\alpha_2$.

As can be seen from comparing FIG. 12A and FIG. 12B, the nodes $p_5$, $p_6$ in the track data $\alpha_2$ (see FIG. 12B) are approximatable to the node $p_{10}$ of planar graph $G_{31}$ (see FIG. 12A). The node $p_7$ in the track data $\alpha_2$ (see FIG. 12B) is also approximatable to the node $p_{11}$ of planar graph $G_{31}$ (see FIG. 12A). The non-nearness cost is the number of nodes remaining in the track data $\alpha_2$, namely 2, the node $p_8$ and the node $p_9$.

Figure 12C:
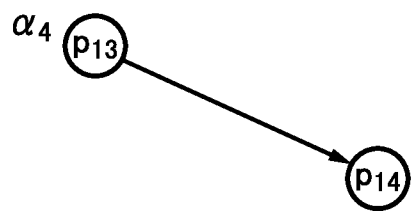
FIG. 12C is a graph illustrating track data based on track data $\alpha_4$.

As can be seen from comparing FIG. 12A and FIG. 12C, the nodes $p_{13}$, $p_{14}$ in the track data $\alpha_4$ (see FIG. 12C) are approximatable to the nodes $p_3$, $p_4$ of planar graph $G_{31}$ (see FIG. 12A). The non-nearness cost is the number of nodes remaining in the track data $\alpha_4$, namely 0. The complexity cost of the planar graph $G_{31}$ is 6. Thus the final cost C is 8.

Figure 13A:
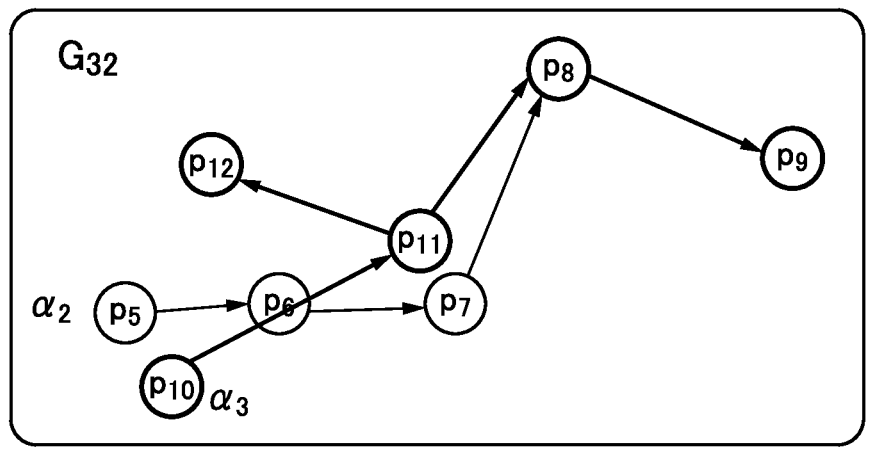
FIG. 13A is a diagram illustrating a track of planar graph $G_{32}$ in which track data $\alpha_2$ has been added to planar graph $G_3$.

Moreover, as illustrated in FIG. 13A, the result of adding the track based on the track data $\alpha_2$ to the planar graph G* (step 116 (see FIG. 5)) is generated as the planar graph G ($G_{32}$). In the planar graph $G_{32}$ of FIG. 13A, the nodes $p_5$, $p_6$, $p_7$ in the track data $\alpha_2$ are approximatable to the nodes $p_{10}$, $p_{11}$ of planar graph $G_3$.

The remaining track data $\alpha_1$ (see FIG. 13B) and track data $\alpha_4$ (see FIG. 13C) are added to the planar graph $G_{32}$ and the costs are computed (step 117 (see FIG. 5)). The non-nearness costs in such a case are respectively 3, 1, as illustrated in the row corresponding to the planar graph $G_{32}$ of FIG. 15.

Figure 13B:
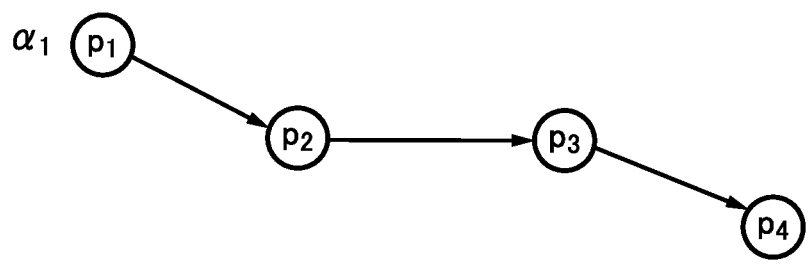
FIG. 13B is a diagram illustrating a track based on track data $\alpha_1$.

As can be seen from comparing FIG. 13A and FIG. 13B, the node $p_2$ in the track data $\alpha_1$ (see FIG. 13B) is approximatable to the node $p_{12}$ of planar graph $G_{32}$ (see FIG. 13A). The non-nearness cost is the number of nodes remaining in the track data $\alpha_1$, namely 3, the node $p_1$, the node $p_3$, and the node $p_4$.

Figure 13C:
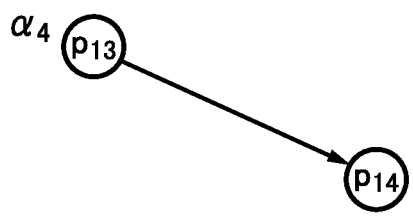
FIG. 13C is a diagram illustrating a track based on track data $\alpha_4$.

As can be seen from comparing FIG. 13A and FIG. 13C, the node $p_{13}$ in the track data $\alpha_4$ (see FIG. 13C) is approximatable to the node $p_{11}$ of planar graph $G_{32}$ (see FIG. 13A). The non-nearness cost is the number of nodes remaining in the track data $\alpha_4$, namely 1, the node $p_{14}$. The complexity cost of the planar graph $G_{32}$ is 5. The final cost C is accordingly 9.

Figure 14A:
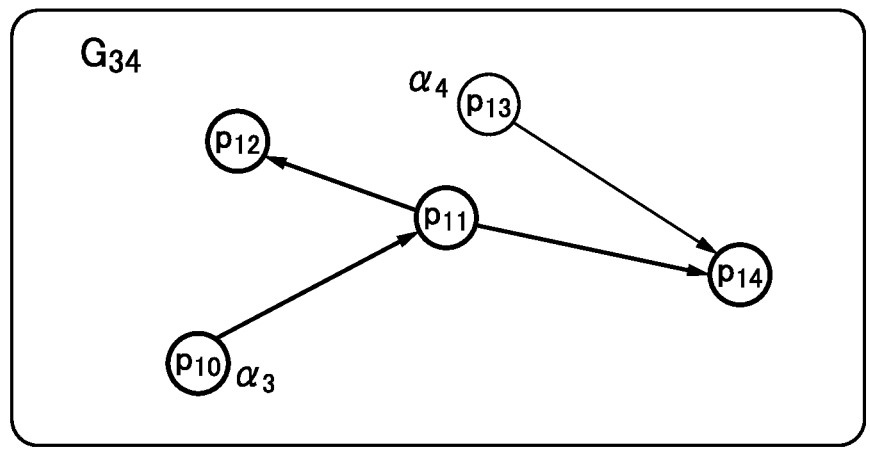
FIG. 14A is a diagram illustrating a track of planar graph $G_{34}$ in which track data $\alpha_4$ has been added to planar graph $G_3$.

As illustrated in FIG. 14A, the result of adding the track based on the track data $\alpha_4$ to the planar graph G* is generated as the planar graph G ($G_{34}$) (step 116 (see FIG. 5)). In the planar graph $G_{34}$ of FIG. 14A, the node $p_{13}$ in the track data $\alpha_4$ is approximatable to the node $p_{11}$ in the planar graph $G_3$.

The remaining track data $\alpha_1$ (see FIG. 14B) and track data $\alpha_2$ (see FIG. 14C) are added to the planar graph $G_{34}$ and the cost computed (step 117 (see FIG. 5)). The non-nearness costs in such a case are respectively 3, 2, as listed in the row corresponding to the planar graph $G_{34}$ in FIG. 15.

Figure 14B:
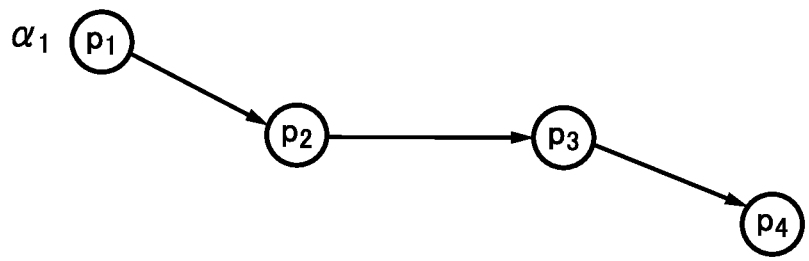
FIG. 14B is a diagram illustrating a track based on track data $\alpha_1$.

As can be seen from comparing FIG. 14A and FIG. 14B, the node $p_2$ in the track data $\alpha_1$ (see FIG. 14B) is approximatable to the node $p_{11}$ of planar graph $G_{34}$ (see FIG. 14A). The non-nearness cost is the number of remaining nodes in the track data $\alpha_1$, namely 3, the node $p_1$, the node $p_3$, and the node $p_4$.

Figure 14C:
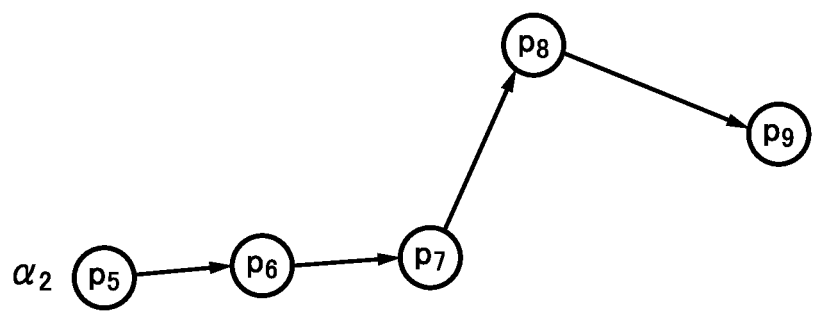
FIG. 14C is a diagram illustrating a track based on track data $\alpha_2$.

As can be seen from comparing FIG. 14A and FIG. 14C, the nodes $p_5$, $p_7$, $p_9$ in the track data $\alpha_2$ (see FIG. 14C) are approximatable to the nodes $p_{10}$, $p_{11}$, $p_{14}$ of planar graph $G_{34}$ (see FIG. 14A). The non-nearness cost is the number of remaining nodes in the track data $\alpha_1$, namely 2. The complexity cost of the planar graph $G_{34}$ is 4. The final cost C is 9.

From the above, the track data that gives the smallest cost when added to the planar graph G* is the track data $\alpha_1$. The smallest cost C in the loop this time is 8. The smallest cost at the previous loop is 9. The determination result of step 98 is accordingly affirmative determination. At step 100 (FIG. 4), the track data $\alpha_1$ is added to the planar graph G* to generate the planar graph $G_{31}$. This stage is the second stage from the top edge of FIG. 19. At step 102, the track data $\alpha_1$ is eliminated from the track data collection T. The track data $\alpha_2$, $\alpha_4$ remain in the collection T. The determination result of step 94 is accordingly negative determination, and the path model generation processing enters the third loop.

At step 96 in the third loop, execution employs the planar graph G* as the planar graph $G_{31}$.

Figure 16A:
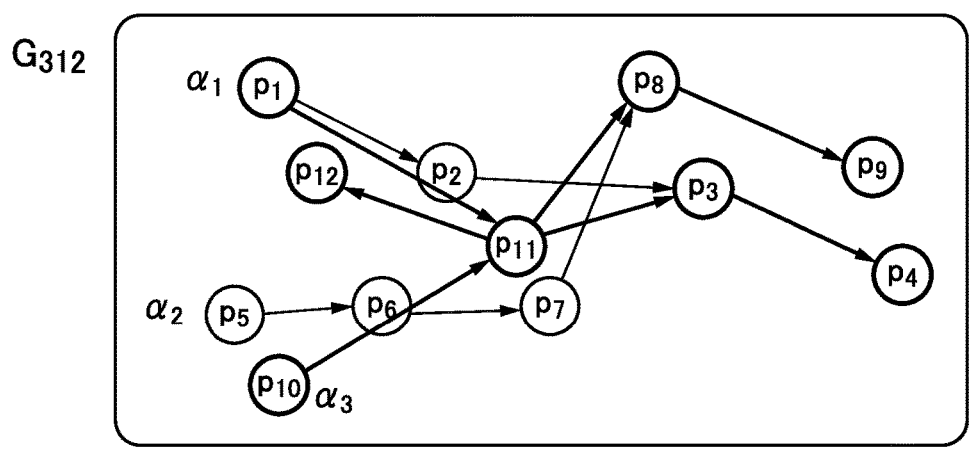
FIG. 16A is a diagram illustrating a track of planar graph $G_{312}$ in which track data $\alpha_2$ has been added to planar graph $G_{31}$.
Figure 16B:
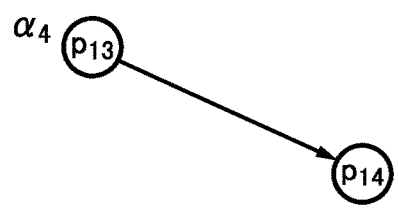
FIG. 16B is a diagram illustrating a track based on track data $\alpha_4$.

More specifically, as illustrated in FIG. 16A, the track data $\alpha_2$ added to the planar graph G* is first generated as the planar graph G ($G_{312}$) (step 116 (see FIG. 5)). In the planar graph $G_{312}$ of FIG. 16A, the nodes $p_5$, $p_6$ in the track data $\alpha_2$ are approximated to the node $p_{10}$, and the node $p_7$ in the track data $\alpha_1$ is approximated to the node $p_{11}$. The remaining track data $\alpha_4$ is added to the planar graph $G_{312}$ (see FIG. 16B) and the cost computed (step 117 (see FIG. 5)). In this case the nodes $p_{13}$, $p_{14}$ of the track data $\alpha_4$ are approximated to the nodes $p_3$, $p_4$ of the planar graph $G_{312}$, and the non-nearness cost is 0. The final cost is the value of only the complexity cost of the planar graph $G_{312}$=8.

Figure 17A:
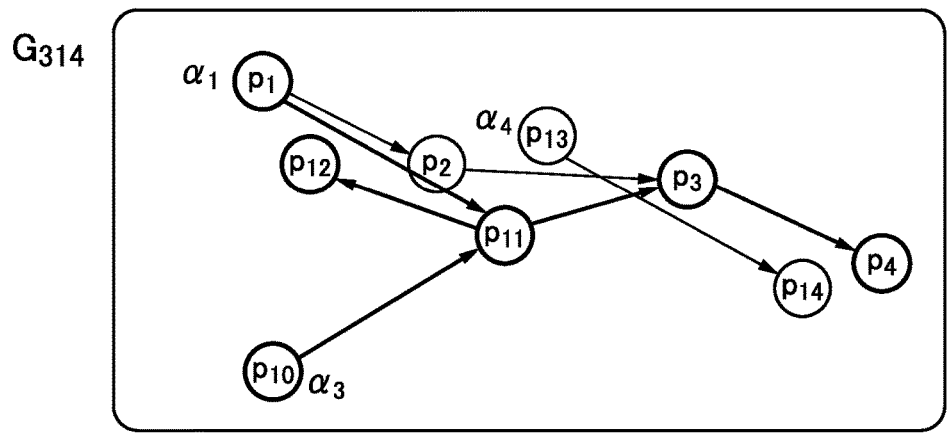
FIG. 17A is a diagram illustrating a track of planar graph $G_{314}$ in which track data $\alpha_4$ has been added to planar graph $G_{31}$.
Figure 17B:
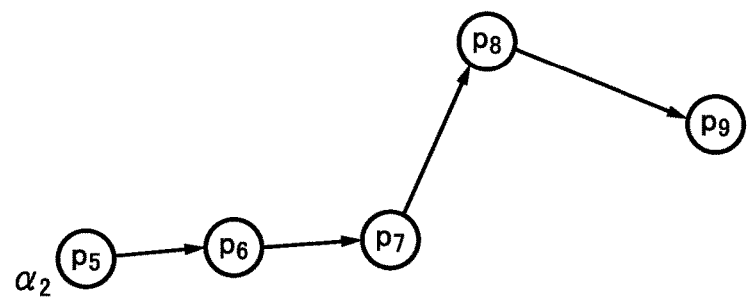
FIG. 17B is a diagram illustrating a track based on track data $\alpha_2$.

As illustrated in FIG. 17A, first the track data $\alpha_4$ added to the planar graph G* is generated as the planar graph G ($G_{314}$) (step 116 (see FIG. 5)). In the planar graph $G_{314}$ of FIG. 17A the nodes $p_{13}$, $p_{14}$ of the track data $\alpha_4$ are approximated to the nodes $p_{11}$, $p_4$. The remaining track data $\alpha_2$ is added to the planar graph $G_{314}$ (see FIG. 17B) and the cost computed (step 117 (see FIG. 5)). The nodes $p_5$, $p_7$, $p_9$ of the track data $\alpha_2$ in such a case are approximated to the nodes $p_{10}$, $p_{11}$, $p_4$ of the planar graph $G_{314}$, and the non-nearness cost is 2, the nodes $p_6$, $p_8$. The complexity cost of the planar graph $G_{314}$=6. The final cost is accordingly 8.

As described above, the final cost C*(=8) of the third loop is the same as the minC at the current stage (the smallest value in the second loop=8). The determination result of step 98 of FIG. 4 is accordingly negative determination. In such a case the path model generation processing proceeds to step 104.

At step 104, the planar graph generation section 84 adds the track data collection T (the track data $\alpha_2$, $\alpha_4$) to the planar graph G*, and the planar graph cost calculation section 86 computes the new planar graph G*, and the cost C including the complexity cost and the non-nearness cost at that time. This processing is the processing of FIG. 6. The final planar graph G* is generated thereby. This stage corresponds to the lowest edge position of FIG. 19.

At step 106, the planar graph cost calculation section 86 outputs to the storage region 60A of the secondary storage device 60 (stores) the final planar graph G* and the cost C* of the planar graph G*. The final planar graph G* is generated as the graph $G_{3124}$ illustrated in FIG. 18B as the path model.

Figure 18A:
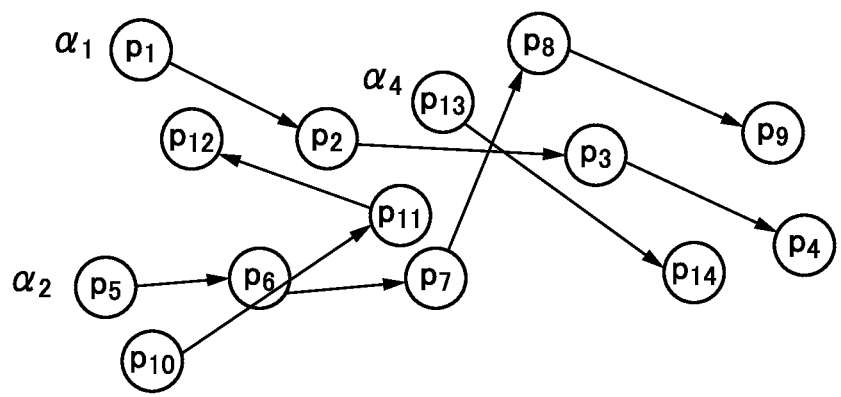
FIG. 18A is diagram illustrating a graph in which all the tracks of track data $\alpha_1$ to $\alpha_4$ have been superimposed as they are.
Figure 18B:
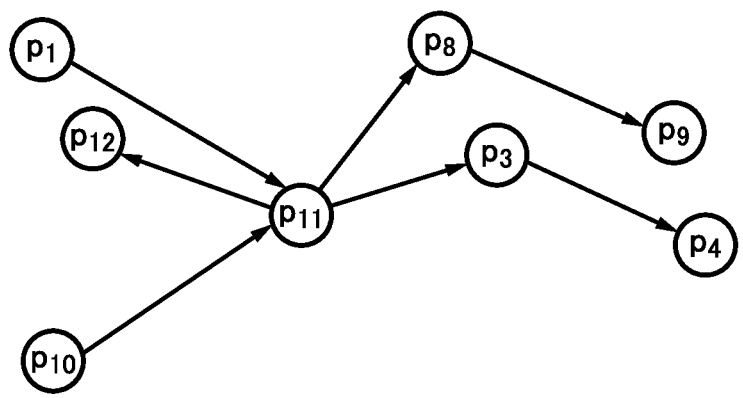
FIG. 18B is a diagram illustrating a track of a final planar graph G*.

A graph of all the tracks of the track data $\alpha_1$ to $\alpha_4$ superimposed as they are would have 14 nodes, as illustrated in FIG. 18A, however the path model has been able to reduce the number to 8 nodes, as illustrated in FIG. 18B.

Figure 20:
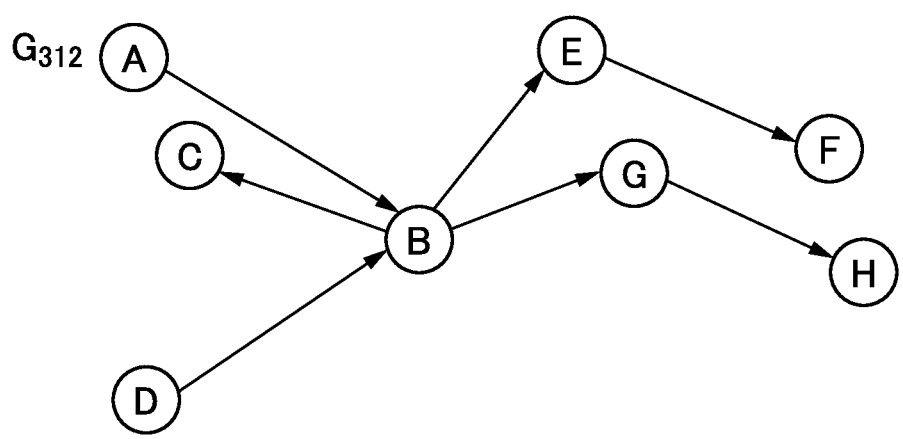
FIG. 20 is a diagram illustrating a path model.

When a path model is generated such as described above, the final planar graph G* (see FIG. 18B) is mapped onto the path model, as illustrated in FIG. 20. The path model is stored in the storage region 60B of the secondary storage device 60. The track data $\alpha_1$ is a path of nodes A→B→G→H. The track data $\alpha_2$ is nodes D→B→E→F. The track data $\alpha_3$ is nodes D→B→C. The track data $\alpha_4$ is nodes B→G→H. Frequent part-path detection analysis is executed based on the path model. More specifically, the number of vehicles that have passed along the same path is computed. The following result is obtained thereby. Firstly, nodes B→G→H are obtained as a frequent part-path. This is because it can be determined that vehicles on track data $\alpha_1$ and track data $\alpha_4$ pass through this part-path. Secondly, nodes D→B are obtained as another frequent part-path. This is because it can be determined that vehicles on track data $\alpha_2$ and track data $\alpha_3$ pass through this part-path.

It is conceivable from such results that, for example, there is congestion at node B. Accordingly it may be concluded that a new crossing point or road needs to be installed in order to bypass the node B to alleviate congestion.

Explanation next follows regarding advantageous effects of the present exemplary embodiment.

First Advantageous Effect

In order to obtain track data for people who can move around freely in an open space (for example in an exhibition hall), hitherto the person movement range was divided into plural regions of a specific surface area (a mesh), and each of the coordinates converted into a mesh. In path analysis, the ODs (origin points, destination points) are combined with the mesh, and the path is represented as a mesh sequence.

However, if the surface area of each mesh is small then minor misalignment has a detrimental impact on the analysis results. Conversely, if the surface area of each mesh is large, then sometimes significant information is overlooked. Thus the size of the mesh needs to be set appropriately in path analysis using a mesh.

Moreover, combining ODs with a mesh and representing a path as a mesh sequence to obtain an appropriate analysis result presupposes that the person movement range is known in advance, such as by a map. Thus, appropriate analysis results can not be obtained in regions where maps have not been drawn. Moreover, even in regions that have maps, appropriate analysis results can not similarly be obtained in cases in which a new road or the like has been provided that is not marked on the maps.

The present exemplary addresses this point by generating a planar graph for analysis using track data alone. The present exemplary is accordingly capable of eliminating the need to introduce a mesh itself, consequently eliminating the need to tune the coarseness of the mesh.

The present exemplary embodiment enables origin points and destination points to be found in a planar graph obtained based on a collection of track data alone, enables frequent origin points and destination points to be found, enables part-paths to be found, and enables frequent part-paths to be detected.

Accordingly, even in regions for which maps have not been drawn, appropriate determination results are obtainable from a planar graph generated by employing track data alone. Moreover, in regions that have maps, appropriate analysis results are obtainable from planar graphs generated by employing track data alone even in cases in which a new road or the like has been provided that is not marked on the maps.

The present exemplary embodiment accordingly exhibits the excellent advantageous effect of enabling a planar graph capable of providing appropriate analysis results (added track data) to be obtained.

Third Advantageous Effect

FIG. 19 illustrates all combinations during superimposing tracks based on each of the four track data $\alpha_1$ to $\alpha_4$ one-by-one and generating the planar graph. It is conceivable, theoretically, to generate planar graph for all the combinations. However, the computation load expands as the number of sets of track data increases. The present exemplary embodiment, however, restricts the track data added by selecting the combination with the smallest cost C* during superimposition of the track data one-by-one, reducing the computation load. This thereby enables a final planar graph to be generated with a small computation load even when there are a large number of sets of track data.

Fourth Advantageous Effect

In the present exemplary embodiment, the track with the smallest cost is selected and added to generate an intermediate planar graph during adding track data one-by-one to the planar graph. During adding the next track to the intermediate planar graph, sometimes the derived cost is not smaller than the cost of the already generated intermediate planar graph. In such cases, determination can be made that the above cost will not reduce, namely a planar graph that is as simple as possible and approximates with as great precision as possible will not result from further computation. In cases in which the cost will not be lowered further, the present exemplary embodiment simply adds the tracks based on the remaining track data. The present exemplary embodiment accordingly exhibits the advantageous effect of enabling the computation load to be reduced.

Fifth Advantageous Effect

Searching for routes to avoid congestion has been conventionally performed. However, as stated above, frequent part-path detection analysis in the present exemplary embodiment enables an expansion of the options available for searching for congestion avoiding routes based on a comprehensive traffic situation. Frequent part-path detection analysis also enables prediction of which crossings congestion is liable to occur at, and prediction of by-passing routes. This thereby facilitates the prediction of destination times of people and vehicles. There is, moreover, an expectation that the present exemplary embodiment will be a beneficial tool in traffic network planning, such as in the construction of bypass routes. The present exemplary embodiment accordingly exhibits the advantageous effect of enabling a wide perspective on movements of people on a planar graph.

Explanation now follows regarding modified example of the present exemplary embodiment.

First Modified Example

In the present exemplary embodiment, a value arrived at by simple addition of the two cost components is employed as a cost with components of the non-nearness cost and the complexity cost. However, in technology disclosed herein, for example, a value may be employed from weighted addition with emphasis placed on the complexity cost. Weighting coefficients may be prepared according to computation results.

Second Modified Example

In the present exemplary embodiment a number of nodes is employed as the non-nearness cost. However, in technology disclosed herein, the number of links between nodes not present in an approximation range, or the sum of the lengths of such links, may be employed as the non-nearness cost. Moreover, an imaginary circle of specific surface area may be drawn around each of all the nodes present outside of the approximation range, and in cases in which links are present, imaginary rectangles may be drawn that have a central axis along the length direction of each of the links, enabling the total surface area of the imagined circles and rectangles to be employed as the above cost. In addition, the distance between the most distant nodes among the nodes present outside the approximation range may be employed as the above cost. Moreover, a combination of the above costs may also be made.

Third Modified Example

The present exemplary embodiment employs the number of nodes as the complexity cost. However, technology disclosed herein may employ the number of links, the total length of links, or a combination thereof as the complexity cost.

Fourth Modified Example

The present exemplary embodiment employs a Frechet Distance algorithm as a method to detect matching portions in which respective potions, in a combination of a given track in a planar graph and a track to be added to the given track, have a distance between each other within a specific value $\varepsilon$. However, technology disclosed herein may employ an algorithm using Euclidian distance.

Fifth Modified Example

The present exemplary embodiment approximates to a node of a given track in a planar graph, a node of a track that is to be added to the given track. However, technology disclosed herein may approximate a node of a track of the planar graph to a node of the track that is to be added, or may approximate the two nodes to an intermediate point between the two nodes.

Sixth Modified Example

The present exemplary embodiment employs vehicles as the moving bodies. However, technology disclosed herein may employ people, or animals, such as wild animals, as the subject. For example, the above sensors may be installed to mobile phones, for example smartphones, enabling people to be used as the subject. Moreover, technology disclosed herein may employ people, vehicles, or flying objects as the subject, and may add altitude data to the latitude and longitude data as positional data, enabling a three dimensional graph (added track data) to be generated.

Seventh Modified Example

The analyses of the present exemplary embodiment may take as the subject a road network in regions where sufficient maps have been drawn up. However, technology disclosed herein may be employed in automatic collaborative generation and maintenance of a road network in regions where there are not sufficient maps drawn up. Moreover, technology disclosed herein enables a traffic statistical survey (traffic census) to be performed using actual data, instead of questionnaire data. This thereby enables a reduction in survey cost to be achieved.

Eighth Modified Example

In the present exemplary embodiment, at step 102 the track data is eliminated from the collection T, and at step 94 determination is made as to whether or not collection T has become an empty collection. However, technology disclosed herein may transition processing to each of the plural track data in the collection T at step 102, and determine at step 94 whether or not processing has been performed to all the plural track data present in the collection T.

An aspect of technology disclosed herein exhibits the advantageous effect of enabling a planar graph to be obtained that is capable of providing appropriate analysis results.

All publications, patent applications and technical standards mentioned in the present specification are incorporated by reference in the present specification to the same extent as if the individual publication, patent application, or technical standard was specifically and individually indicated to be incorporated by reference patent application, or technical standard was specifically and individually indicated to be incorporated by reference.

What is claimed is:

1. A plane graph generation device comprising:
a memory; and
a processor configured to execute a process, the process comprising:
selecting first track data that is associated with a smallest specific cost among a collection of track data, the collection of track data including the first track data, a second track data, and a third track data, wherein
each track data in the collection is obtained from a position detection sensor mounted on a moving vehicle and includes a plurality of positional data each representing a position on a path along which the moving vehicle has moved and link data representing links between the positions on the path, and
the specific cost associated with the first track data in the collection is a value that includes a first component and a second component,
the first component, representing complexity of the first track data, includes at least one selected from the group consisting of
a number of positions in the first track data,
a number of the links in the first track data, and
a total length of the links in the first track data, and
the second component, representing a non-nearness between the first track data and each of all the other track data in the collection, includes at least one selected from the group consisting of
the number of positions of the first track data that are outside a region, the region being represented by the respective positions of the first track data and track data other than the first track data that are within a specific distance of each other,
the number of links of the first track data that are outside the region,
the total length of the links of the first track data that are outside the region,
a surface area determined from the positions and the links of the first track data that are outside the region, and
a greatest distance between the positions of the first track data that are outside the region;
selecting the second track data based on a specific cost of the second track data being less than a specific cost of the third track data;
if none of the respective positions within the first track data and the second track data is within a predetermined distance from each other, adding the positional data and the link data of the first track data to the second track data; and
if there is a first set of positions within the first track data and a second set of positions within the second track data that are within the predetermined distance from each other, modifying the second track data by changing the second set of positions within the second track data to a first set of positions or to a combination of a first set of positions and a second set of positions; and
generating, based on the second track data, a plane graph in which the positions of the moving vehicle are simplified to be used for analyzing paths along which the moving vehicle has moved.

2. The planar graph generation device of claim 1, the process further comprising:
determining whether or not there is track data remaining in the collection, and whether or not the specific cost value of the first track has fallen below a previous specific cost; and
in cases in which it is determined that there is track data in the collection and the specific cost value of the first track has not fallen below the previous specific cost, adding all the track data remaining in the collection to the first track data and the second track data.

3. The planar graph generation device of claim 1, wherein the specific cost is determined based on whether or not there are portions of the first track and the second track positioned within a specific distance of each other in a combination of the first track data and each respective track of all the other track data, the second component representing the non-nearness being computed based on content of track data of portions of the first track and the second track other than the portions of the first track and the second track positioned within the specific distance of each other in cases in which there are portions of the first track and the second track positioned within the specific distance of each other in the respective tracks, and the second component representing the non-nearness being computed based on content of the first track data and content of each of all the other track data in cases in which there are no portions of the first track and the second track positioned within the specific distance of each other in the respective tracks.

4. The planar graph generation device of claim 1, wherein the specific cost is a summation value of the first component and the second component.

5. The planar graph generation device of claim 4, wherein the summation value is a weighted summation value.

6. A non-transitory recording medium storing a program that causes a computer to execute a planar graph generation process, the process comprising:
selecting first track data that is associated with a smallest specific cost among a collection of track data, the collection of track data including the first track data, a second track data, and a third track data, wherein
each track data in the collection is obtained from a position detection sensor mounted on a moving vehicle and includes a plurality of positional data each representing a position on a path along which the moving vehicle has moved and link data representing links between the positions on the path, and
the specific cost associated with the first track data in the collection is a value that includes a first component and a second component,
the first component, representing complexity of the first track data, includes at least one selected from the group consisting of
a number of positions in the first track data,
a number of the links in the first track data, and
a total length of the links in the first track data, and
the second component, representing a non-nearness between the first track data and each of all the other track data in the collection, includes at least one selected from the group consisting of
the number of positions of the first track data that are outside a region, the region being represented by the respective positions of the first track data and track data other than the first track data that are within a specific distance of each other,
the number of links of the first track data that are outside the region,
the total length of the links of the first track data that are outside the region,
a surface area determined from the positions and the links of the first track data that are outside the region, and
a greatest distance between the positions of the first track data that are outside the region;
selecting the second track data based on a specific cost of the second track data being less than a specific cost of the third track data;
if none of the respective positions within the first track data and the second track data is within a predetermined distance from each other, adding the positional data and the link data of the first track data to the second track data; and
if there is a first set of positions within the first track data and a second set of positions within the second track data that are within the predetermined distance from each other, modifying the second track data by changing the second set of positions within the second track data to a first set of positions or to a combination of a first set of positions and a second set of positions; and
generating, based on the second track data, a plane graph in which the positions of the moving vehicle are simplified to be used for analyzing paths along which the moving vehicle has moved.

7. The non-transitory recording medium of claim 6, the planar graph generation process further comprising:
determining whether or not there is track data remaining in the collection, and whether or not the specific cost value of the first track has fallen below a previous specific cost; and
in cases in which it is determined that there is track data in the collection and the specific cost value of the first track has not fallen below the previous specific cost, adding all the track data remaining in the collection to the first track data and the second track data.

8. The non-transitory recording medium of claim 6, wherein, in the planar graph generation process:
the specific cost is determined based on whether or not there are portions of the first track and the second track positioned within a specific distance of each other in a combination of the first track data and each respective track of all the other track data, the second component representing the non-nearness being computed based on content of track data of portions of the first track and the second track other than the portions of the first track and the second track positioned within the specific distance of each other in cases in which there are portions of the first track and the second track positioned within the specific distance of each other in the respective tracks, and the second component representing the non-nearness being computed based on content of the first track data and content of each of all the other track data in cases in which there are no portions of the first track and the second track positioned within the specific distance of each other in the respective tracks.

9. The non-transitory recording medium of claim 6, wherein, in the planar graph generation process, the specific cost is a summation value of the first component and the second component.

10. The non-transitory recording medium of claim 9, wherein, in the planar graph generation process, the summation value is a weighted summation value.

11. The non-transitory recording medium of claim 6, wherein, in the planar graph generation process:
the first track data includes a plurality of positional data each representing a position on a track along which the moving vehicle has moved, and link data representing links between positions; and
the first component is expressed by at least one selected from the group consisting of a number of positions expressed by the positional data, a number of the links, and a total length of the links.

12. A plane graph generation method comprising:
selecting first track data that is associated with a smallest specific cost among a collection of track data, the collection of track data including the first track data, a second track data, and a third track data, wherein
each track data in the collection is obtained from a position detection sensor mounted on a moving vehicle and includes a plurality of positional data each representing a position on a path along which the moving vehicle has moved and link data representing links between the positions on the path, and
the specific cost associated with the first track data in the collection is a value that includes a first component and a second component,
the first component, representing complexity of the first track data, includes at least one selected from the group consisting of
a number of positions in the first track data,
a number of the links in the first track data, and
a total length of the links in the first track data, and
the second component, representing a non-nearness between the first track data and each of all the other track data in the collection, includes at least one selected from the group consisting of
the number of positions of the first track data that are outside a region, the region being represented by the respective positions of the first track data and track data other than the first track data that are within a specific distance of each other,
the number of links of the first track data that are outside the region,
the total length of the links of the first track data that are outside the region,
a surface area determined from the positions and the links of the first track data that are outside the region, and
a greatest distance between the positions of the first track data that are outside the region;
selecting the second track data based on a specific cost of the second track data being less than a specific cost of the third track data;
if none of the respective positions within the first track data and the second track data is within a predetermined distance from each other, adding the positional data and the link data of the first track data to the second track data; and
if there is a first set of positions within the first track data and a second set of positions within the second track data that are within the predetermined distance from each other, modifying the second track data by changing the second set of positions within the second track data to a first set of positions or to a combination of a first set of positions and a second set of positions; and generating, based on the second track data, a plane graph in which the positions of the moving vehicle are simplified to be used for analyzing paths alone which the moving vehicle has moved.

13. The planar graph generation method of claim 12, further comprising:

determining whether or not there is track data remaining in the collection, and whether or not the specific cost has fallen below a previous specific cost; and in cases in which it is determined that there is track data in the collection and the specific cost value of the first track has not fallen below the previous specific cost, adding all the track data remaining in the collection to the first track data and the second track data.

14. The planar graph generation method of claim 12, wherein:

the specific cost is determined based on whether or not there are portions of the first track and the second track positioned within a specific distance of each other in a combination of the first track data and each respective track of all the other track data, the second component representing the non-nearness being computed based on content of track data of portions of the first track and the second track other than the portions of the first track and the second track positioned within the specific distance of each other in cases in which there are portions of the first track and the second track positioned within the specific distance of each other in the respective tracks, and the second component representing the non-nearness being computed based on content of the first track data and content of each of all the other track data in cases in which there are no portions of the first track and the second track positioned within the specific distance of each other in the respective tracks.

15. The planar graph generation method of claim 12, wherein the specific cost is a summation value of the first component and the second component.

\* \* \* \* \*